US009803053B2

(12) United States Patent
Kraus et al.

(10) Patent No.: US 9,803,053 B2
(45) Date of Patent: Oct. 31, 2017

(54) ADDITIVE FOR RHEOLOGY IMPROVEMENT OF INORGANIC BINDERS

(71) Applicant: Construction Research & Technology, GmbH, Trostberg (DE)

(72) Inventors: Alexander Kraus, Pittenhart (DE); Joachim Dengler, Tacherting (DE); Torben Gädt, Traunstein (DE); Sandro Moro, Treviso (IT); Juergen Bokern, Lohne (DE); Anil Bendale, Mulund (IN); Nicolas Moins, Evry (FR); Nicoletta Zeminian, Treviso (IT)

(73) Assignee: Construction Research & Technology, GmbH, Trostberg (DE)

( * ) Notice: Subject to any disclaimer, the term of this patent is extended or adjusted under 35 U.S.C. 154(b) by 0 days.

(21) Appl. No.: 15/102,757

(22) PCT Filed: Dec. 16, 2014

(86) PCT No.: PCT/EP2014/077935
§ 371 (c)(1),
(2) Date: Jun. 8, 2016

(87) PCT Pub. No.: WO2015/091461
PCT Pub. Date: Jun. 25, 2015

(65) Prior Publication Data
US 2016/0319072 A1    Nov. 3, 2016

(30) Foreign Application Priority Data

Dec. 20, 2013    (EP) .................................... 13199011

(51) Int. Cl.
| C08G 63/02 | (2006.01) |
| C08G 65/335 | (2006.01) |
| C04B 24/30 | (2006.01) |
| C08G 65/331 | (2006.01) |
| C04B 24/24 | (2006.01) |
| C04B 28/04 | (2006.01) |
| C04B 28/16 | (2006.01) |
| C04B 24/32 | (2006.01) |
| C04B 28/20 | (2006.01) |
| C04B 103/30 | (2006.01) |
| C04B 103/00 | (2006.01) |

(52) U.S. Cl.
CPC ........ *C08G 65/3355* (2013.01); *C04B 24/246* (2013.01); *C04B 24/30* (2013.01); *C04B 24/32* (2013.01); *C04B 28/04* (2013.01); *C04B 28/16* (2013.01); *C04B 28/20* (2013.01); *C08G 65/331* (2013.01); *C04B 2103/0079* (2013.01); *C04B 2103/30* (2013.01); *C04B 2103/302* (2013.01); *Y02W 30/92* (2015.05); *Y02W 30/94* (2015.05)

(58) Field of Classification Search
CPC .................................................. C08G 65/3355
USPC ...................................................... 524/2, 3, 5
See application file for complete search history.

(56) References Cited

U.S. PATENT DOCUMENTS

| 3,275,667 | A | 9/1966 | Bohunek et al. |
| 3,954,808 | A | 5/1976 | Elliott et al. |
| 4,349,386 | A | 9/1982 | Davidovits |
| 4,472,199 | A | 9/1984 | Davidovits |
| 4,509,985 | A | 4/1985 | Davidovits et al. |
| 4,725,665 | A | 2/1988 | Pieh et al. |
| 5,332,041 | A | 7/1994 | Onan et al. |
| 5,355,954 | A | 10/1994 | Onan et al. |
| 5,360,841 | A | 11/1994 | Knop et al. |
| 5,413,634 | A | 5/1995 | Shawl et al. |
| 5,609,680 | A | 3/1997 | Kobayashi et al. |
| 5,707,445 | A | 1/1998 | Yamato et al. |
| 5,709,743 | A | 1/1998 | Leture et al. |
| 5,779,742 | A | 7/1998 | Baker |
| 5,856,279 | A | 1/1999 | Baker |
| 5,925,184 | A | 7/1999 | Hirata et al. |
| 6,147,036 | A | 11/2000 | Baker |
| 6,170,574 | B1 | 1/2001 | Jones |
| 6,376,581 | B1 | 4/2002 | Tanaka et al. |
| 6,462,110 | B2 | 10/2002 | Satoh et al. |
| 6,832,652 | B1 | 12/2004 | Dillenbeck et al. |
| 7,022,768 | B1 | 4/2006 | Lacroix et al. |
| 7,041,167 | B2 | 5/2006 | Jiang |
| 7,119,152 | B1 | 10/2006 | Lacroix et al. |
| 7,258,736 | B2 | 8/2007 | Oriakhi et al. |
| 7,605,196 | B2 | 10/2009 | Schinabeck et al. |

(Continued)

FOREIGN PATENT DOCUMENTS

| CA | 2071051 | 12/1992 |
| CA | 2172004 | 9/1996 |

(Continued)

OTHER PUBLICATIONS

PCT/EP2011/053349—International Search Report, dated Jul. 29, 2011.
PCT/EP2011/053349—International Written Opinion, dated Jul. 29, 2011.
PCT/EP2011/053349—International Preliminary Report on Patentability, dated Sep. 25, 2012.
PCT/EP2011/070820—International Search Report, dated Apr. 2, 2012.
PCT/EP2011/070820—International Written Opinion, dated Apr. 2, 2012.

(Continued)

*Primary Examiner* — Terressa Boykin
(74) *Attorney, Agent, or Firm* — Curatolo Sidoti Co., LPA; Joseph G. Curatolo; Salvatore A. Sidoti

(57) ABSTRACT

The invention concerns a polycondensate containing (I) at least a structural unit, which is an aromatic moiety bearing a polyether side chain comprising 9 to 41 alkylene glycol units, (II) at least a structural unit, which is an aromatic moiety bearing at least one phosphoric acid ester group and (III) at least a methylene unit ($—CH_2—$), the polycondensate having a polycondensation degree of 10 to 75. Also concerned are building material mixtures containing said polycondensates and the use as dispersant for inorganic binders.

19 Claims, No Drawings

(56) References Cited

U.S. PATENT DOCUMENTS

| | | |
|---|---|---|
| 7,641,731 B2 | 1/2010 | Chanut et al. |
| 7,772,300 B2 | 8/2010 | Schinabeck et al. |
| 7,910,640 B2 | 3/2011 | Wieland et al. |
| 8,053,498 B2 | 11/2011 | Wieland et al. |
| 8,202,362 B2 | 6/2012 | Davidovits et al. |
| 8,436,072 B2 | 5/2013 | Herth et al. |
| 8,349,960 B2 | 6/2013 | Gaeberlein et al. |
| 8,653,186 B2 | 2/2014 | Nicoleau et al. |
| 8,907,016 B2 | 12/2014 | Vierle et al. |
| 9,018,337 B2 | 4/2015 | Chen et al. |
| 9,045,377 B2 | 6/2015 | Nicoleau et al. |
| 2002/0129743 A1 | 9/2002 | Frailey et al. |
| 2002/0166479 A1 | 11/2002 | Jiang |
| 2004/0261664 A1 | 12/2004 | Oriakhi et al. |
| 2005/0256226 A1 | 11/2005 | Thetford et al. |
| 2006/0249056 A1 | 11/2006 | Shiba et al. |
| 2007/0032550 A1 | 2/2007 | Lewis et al. |
| 2007/0163470 A1 | 7/2007 | Chanut et al. |
| 2008/0108732 A1 | 5/2008 | Wieland et al. |
| 2008/0200590 A1 | 8/2008 | Schinabeck et al. |
| 2008/0319217 A1 | 12/2008 | Ingrisch et al. |
| 2009/0054558 A1 | 2/2009 | Wieland et al. |
| 2009/0186964 A1 | 7/2009 | Schinabeck et al. |
| 2010/0004357 A1 | 1/2010 | Shiba et al. |
| 2010/0190888 A1 | 7/2010 | Gaeberle1n et al. |
| 2011/0015301 A1 | 1/2011 | Herth et al. |
| 2011/0054053 A1 | 3/2011 | Lee et al. |
| 2011/0160393 A1 | 6/2011 | Sakamoto et al. |
| 2011/0269875 A1 | 11/2011 | Nicoleau et al. |
| 2011/0281975 A1 | 11/2011 | Kraus et al. |
| 2013/0330532 A1 | 12/2013 | Dierschke et al. |
| 2013/0331539 A1 | 12/2013 | Chen et al. |

FOREIGN PATENT DOCUMENTS

| | | |
|---|---|---|
| CN | 101061151 | 10/2007 |
| CN | 101326136 | 12/2008 |
| DE | 15 93 758 | 10/1970 |
| DE | 16 71 017 | 9/1971 |
| DE | 2 354 995 | 5/1974 |
| DE | 35 27 981 | 2/1987 |
| DE | 43 42 407 | 6/1995 |
| DE | 4411797 | 10/1995 |
| DE | 197 24 700 | 12/1998 |
| DE | 102004050395 | 4/2006 |
| DE | 10 2005 001 101 | 7/2006 |
| DE | 20 2006 016 797 | 12/2006 |
| DE | 10 2005 051 375 | 5/2007 |
| DE | 10 2005 060 947 | 6/2007 |
| DE | 10 2007 027 470 | 12/2008 |
| EP | 0 214 412 | 7/1986 |
| EP | 0 403 974 | 12/1990 |
| EP | 0 518 156 | 12/1992 |
| EP | 0 605 257 | 12/1993 |
| EP | 0 637 574 | 2/1995 |
| EP | 0 780 348 | 6/1997 |
| EP | 1 104 785 | 6/2001 |
| EP | 1 110 981 | 6/2001 |
| EP | 1 142 847 | 10/2001 |
| EP | 1138697 | 10/2001 |
| EP | 1 491 516 | 12/2004 |
| EP | 1655272 | 5/2006 |
| EP | 2 325 231 | 5/2011 |
| JP | 2000095554 | 4/2000 |
| JP | 2001058863 | 3/2001 |
| JP | 2008127247 | 6/2008 |
| WO | WO 85/03699 | 8/1985 |
| WO | WO 2007/071361 | 7/1986 |
| WO | WO 01/38437 | 5/2001 |
| WO | WO 02/070425 | 9/2002 |
| WO | WO 03/072632 | 9/2003 |
| WO | WO 2005/077857 | 8/2005 |
| WO | WO 2005/090424 | 9/2005 |
| WO | WO 2006/002936 | 1/2006 |
| WO | WO 2006/042709 | 4/2006 |
| WO | WO 2008/012438 | 1/2008 |
| WO | WO 2010/026155 | 3/2010 |
| WO | WO 2010/040611 | 4/2010 |
| WO | WO-2010/040612 | 4/2010 |
| WO | WO 2011/006837 | 1/2011 |
| WO | WO 2011/026701 | 3/2011 |
| WO | WO 2011/026720 | 3/2011 |
| WO | WO 2011/026825 | 3/2011 |

OTHER PUBLICATIONS

PCT/EP2011/070820—International Preliminary Report on Patentability, dated Jun. 4, 2013.
PCT/EP2009/061334; International Preliminary Report on Patentability, dated Mar. 8, 2011.
PCT/EP2010/061809; International Written Opinion; dated Nov. 24, 2010.
PCT/EP2010/061809; International Preliminary Report on Patentability; dated Mar. 6, 2012.
PCT/EP2010/061762; International Written Opinion; dated Dec. 21, 2010.
PCT/EP2010/061762; International Preliminary Report on Patentability, dated Mar. 6, 2012.
EP 08163468.5, priority document, dated Sep. 2, 2008.
PCT/EP2010/062671; International Search Report, dated Mar. 11, 2011.
Non-final Office Action for U.S. Appl. No. 13/451,024 dated Sep. 16, 2013.
Final Office Action for U.S. Appl. No. 13/451,024 dated Jan. 28, 2014.
Non-Final Office Action for U.S. Appl. No. 13/451,024 dated Jul. 8, 2014.
Non Final Office Action for U.S. Appl. No. 13/035,281 dated Jun. 5, 2013.
Final Office Action for U.S. Appl. No. 13/035,281 dated Dec. 17, 2013.
Final Office Action for U.S. Appl. No. 13/035,281 dated Apr. 15, 2014.
Non-Final Office Action for U.S. Appl. No. 13/035,281 dated Sep. 25, 2014.
International Search Report and Written Opinion, PCT/EP2014/077935, dated Feb. 24, 2015.
PCT/CN2011/070632—International Written Opinion, dated Oct. 20, 2011.
PCT/CN2011/070632—International Preliminary Report on Patentability, dated Jul. 30, 2013.
PCT/EP2013/056761—International Search Report, dated Aug. 7, 2013.
Biglova, R., et al, "Synthesis of New Stabilisers through Polymer-analogous Conversions", Oxidation Communications, Jan. 1, 1997, vol. 20, No. 1, pp. 139-144, XP009140808.
Cölfen, Helmut; "Analytical Ultracentrifugation of NanoParticles"; Polymer News; 2004; vol. 29; p. 101; Taylor & Francis; Abstract.
Saito, Fumio, et al.; "Mechanical Synthesis of Hydrated Calcium Silicates by Room Temperature Grinding"; Solid State Ionics; 1977; pp. 37-43; Elsevier.
"Silica"; Ullmann's Encyclopedia of Industrial Chemistry; 2002; Wiley-VCH Verlag GmbH & Co. KGaA; Abstract.
PCT/EP2013/056761—International Written Opinion, dated Aug. 7, 2013.
PCT/EP2013/056761—International Preliminary Report on Patentability, dated Oct. 14, 2014.
PCT/CN2011/070632—International Search Report, dated Oct. 20, 2011.
Non Final Office Action for U.S. Appl. No. 13/392,988, dated Aug. 1, 2014.
Non Final Office Action for U.S. Appl. No. 13/988,693, dated Nov. 24, 2014.
PCT/EP2009/061334—International Search Report, dated Jan. 25, 2010.
PCT/EP2009/061334—International Written Opinion, dated Jan. 25, 2010.
International Preliminary Report on Patentability, PCT/EP2014/077935, dated Jun. 21, 2016.

ADDITIVE FOR RHEOLOGY IMPROVEMENT OF INORGANIC BINDERS

CROSS REFERENCE TO RELATED APPLICATIONS

This application is a national stage application of International Application No. PCT/EP2014/077935, filed Dec. 16, 2014, which claims priority from European Patent Application No. 13199011.1, filed Dec. 20, 2013, which applications are incorporated herein by reference.

The present invention relates to a polycondensate containing (I) at least a structural unit, which is an aromatic moiety bearing a polyether side chain comprising alkylene glycol units, with the proviso that the number of ethylene glycol units in the side chain is from 9 to 41 and that the content of ethylene glycol units is higher than 80 mol % with respect to all alkylene glycol units in the polyether side chain, (II) at least a structural unit, which is an aromatic moiety bearing at least one phosphoric acid ester group and/or its salt, with the proviso that the molar ratio of (I) to (II) is from 0.3 to 4, (III) at least a methylene unit ($-CH_2-$), which is attached to two aromatic structural units Y, where aromatic structural units Y, independently of one another, are identical or different and are represented by structural unit (I), structural unit (II) or optionally (IV) aromatic structural units of the polycondensate, which are different from structural unit (I) and structural unit (II) and wherein the polycondensation degree of the polycondensate containing the units (I), (II), (Ill) and optionally (IV) is in the range from 10 to 75. The invention concerns also the use of said polycondensates for the dispersion of inorganic binder materials and building material mixtures comprising the polycondensate and an inorganic binder material, preferably a hydraulic binder material.

It is known that admixtures in the form of dispersants are added to aqueous slurries or pulverulent inorganic or organic substances, such as clays, silicate powder, chalk, carbon black, crushed rock and hydraulic binders, for improving their processibility, i.e. kneadability, spreadability, sprayability, pumpability or flowability. Such admixtures are capable of preventing the formation of solid agglomerates and of dispersing the particles already present and those newly formed by hydration and in this way improving the workability. This effect is utilized in particular in a targeted manner in the preparation of building material mixtures which contain hydraulic binders, such as cement, lime, gypsum, hemihydrate or anhydrite.

In order to convert these building material mixtures based on said binders, into a ready-to-use, processible form, as a rule substantially more mixing water is required than would be necessary for the subsequent hydration or hardening process. The proportion of voids which is formed in the concrete body by the excess of water, subsequently evaporating water leads to significantly poorer mechanical strengths and resistance.

In order to reduce said excess proportion of water at a predetermined processing consistency (workability) and/or to improve the workability at a predetermined water/binder ratio, admixtures are used which are generally referred to as water-reducing agents or plasticizers. In practice copolymers obtained by radical copolymerization (also known as polycarboxylate ethers (PCE)) are used as such agents.

WO 2006/042709 A1 describes polycondensates based on an aromatic or heteroaromatic compound having 5 to 10 C atoms or heteroatoms, having at least one oxyethylene or oxypropylene radical, and an aldehyde selected from the group consisting of formaldehyde, glyoxylic acid and benzaldehyde or mixtures thereof as plasticizer for inorganic binder compositions. In a particular embodiment, said polycondensates may also comprise phosphate polycondensates. In the examples B1 to B5 of WO 2006/042709 A1 are described polycondensates of phenoxyethanol phosphate and ethoxylated phenol (the average number of ethylenoxide units attached is 20.5, respectively 43.3) with an average molecular weight between 20,000 and 29,000 g/mol, in a molar ratio of 2/1 and formaldehyde. The polycondensation degree (PD) of the examples is outside the claimed range of this patent application and/or the number of ethylene glycol units in the side chains is higher than in this patent application. There is no mentioning in WO 2006/042709 A1 of a possible improvement of rheological properties of cementitious compositions, in particular there is no hint to a possible decrease of the (plastic) viscosity of cementitious compositions like concrete.

WO2010/040611 A1 describes a process for the preparation of a phosphorylated polycondensate and to the use thereof as an admixture in building material mixtures. The process is carried out by using alkylsulphonic acids and aromatic sulphonic acids as catalyst for the polycondensation reaction. Advantage is that the process can be carried out in a simple manner and at low cost. Also it is possible to obtain products in the neutralized form, which have high solids contents without precipitation of inorganic salts.

WO2010/040612 A1 relates to a phosphorylated polycondensate, a process for its production and the use as an admixture in a building material mixture. It was object to provide an economical dispersant for hydraulic binders, based on a phosphorylated polycondensate. The dispersant is particularly suitable as a plasticizer agent for concrete and can be prepared in a simple manner and at low costs. With respect to the production process it is regarded as essential that the polycondensation and the phosphorylation reaction of the phosphate monomer component can be carried out in one reaction mixture and at the same time. The phosphorylated aromatic monomer component formed in the reaction solution is neither purified nor isolated, but is used as monomer in the polycondensation reaction step.

WO2012/100417 A1 relates to a process for producing a polycondensation product by polycondensing monomers including (A) an aromatic or heteroaromatic compound containing a polyether chain, (B) optionally an aromatic or heteroaromatic compound and (C) aldehyde, in the presence of a protonation catalyst, like for example sulphuric acid. The process is improved, especially the batch time being shortened, by the combined use of formaldehyde in a fast-release form and formaldehyde in a slow-release form.

The before mentioned publications WO2010/040611 A1, WO2010/040612 A1 and WO2012/100417 A1 describe in the examples relatively long polyethylene glycol side chains with a molecular weight of the side chain between 2,000 g/mol and 5,000 g/mol. The polycondensation degree (PD) is not mentioned in said publications, but it can be calculated. The values of the polycondensation degree (PD) as well as the before mentioned length of the polyether side chain are higher compared to this patent application. Also in none of the before mentioned three publications there is an indication or hint that the rheological properties of concrete could be improved, in particular there is no mentioning on the possible influence on the (plastic) viscosity of concrete.

Dispersants of the copolymer type (PCE) are especially copolymers which are prepared by free-radical copolymerization of acid monomers (for example (meth)acrylic acid) with polyether macromonomers (for example polyalkylene glycol (meth)acrylates). Such copolymers are also called polycarboxylate ethers (PCE) and are described, for example, in EP 0753 488 A2. The properties of the polycarboxylate ethers depend significantly on factors such as acid monomer content and side chain length of the polyalkylene glycol structural units. It is possible according to the requirements to produce relatively good water reducers (sufficient initial slump is obtained, but slump-retention is usually not so good) or slump retainers (initial slump may be not sufficient, but slump-retention over time is satisfactory).

However, it has been found to be disadvantageous in practice that the dispersions of inorganic binders produced with polycarboxylate ethers and with phosphorylated polyether side chains containing polycondensates as dispersant, especially cementitious binders such as concrete, have usually a relatively high viscosity in the fresh state. In the construction sector, particularly in the concrete sector, there is a great need to lower the viscosities of the binder dispersions produced. For example by lower viscosities the pumpability of the concrete is improved, which is often to be pumped over long distances. In the case of reduced viscosities, it is also easier and more reliable to reach all the sites in the casting. Also the process to cast an object with concrete becomes quicker, more reliable and more efficient. It is known that objects of relatively high angularity which are additionally equipped with steel reinforcement place particularly high demands on the concrete processibility (workability), being understood to mean particularly sufficient flowability and good rheological behavior like low plastic viscosity of the concrete.

WO 94/08913 discloses polyethylene glycol structures with a diphosphonate function as an anchor group at one end of the polyethylene glycol. These compounds are likewise used as dispersants, for example for concrete. Said plasticizers have an improved viscosity compared to the polycarboxylate ethers, i.e. a reduced viscosity relative to the polycarboxylate ethers, but the strengths, particularly the early strengths, of the concrete are adversely affected to a relatively high degree. This is a great disadvantage on the building site, since the progress of building is known to depend crucially on the early strengths of the concrete. In the precast concrete field, the cycles for the completion of the precast concrete component likewise depend crucially on the early strengths. There is still a need in the building industry to further enhance the early strengths of the concrete, more particularly compared to the plasticizers. More particularly, plasticizers with low viscosity and good development of early strength are desired. Early strength is understood to mean, especially preferably, the strengths after 6 to 24 hours after the building material mixture has been made up with water, more preferably after 12 to 24 hours and especially preferably after 24 hours. The early strengths are determined to ASTM standard C109/C109M-11a.

It is thus an object of the present invention to provide dispersants which provide a sufficient water reduction capacity at good economic viability (cost), enable a reduction in the viscosities of cementitious compositions, especially of concrete, and at the same time achievement of very good early strengths. These properties are desired very particularly in the precast concrete field and deep foundations. In particular it is object of this invention to improve the rheology of the concrete by reducing its plastic viscosity.

This object is achieved by a polycondensate containing
(I) at least a structural unit, which is an aromatic moiety bearing a polyether side chain comprising alkylene glycol units, preferably $C_2$-$C_5$ alkylene glycol units, more preferably $C_2$-$C_3$ alkylene glycol units, with the proviso that the number of ethylene glycol units in the side chain is from 9 to 41 and that the content of ethylene glycol units is higher than 80 mol %, preferably higher than 85 mol %, more preferably higher than 90 mol %, most preferably higher than 95 mol %, with respect to all alkylene glycol units in the polyether side chain,
(II) at least a structural unit, which is an aromatic moiety bearing at least one phosphoric acid ester group and/or its salt, preferably at least one phosphoric acid monoester and/or its salt, with the proviso that the molar ratio of (I) to (II) is from 0.3 to 4,
(III) at least a methylene unit (—$CH_2$—), which is attached to two aromatic structural units Y, where
aromatic structural units Y, independently of one another, are identical or different and are represented by structural unit (I), structural unit (II) or optionally (IV) aromatic structural units of the polycondensate, which are different from structural unit (I) and structural unit (II) and
wherein the polycondensation degree of the polycondensate containing the units (I), (II), (III) and optionally (IV) is in the range from 10 to 75, preferably 20 to 70, more preferably 30 to 65. Preferably the phosphoric acid ester group is an ester of phosphoric acid and an alcohol bearing an aromatic moiety.

The object is further achieved by building material mixtures comprising one or more polycondensates according to this invention and one or more inorganic binders selected from the group of α-calcium sulfate hemihydrate, β-calcium sulfate hemihydrate, calcium sulfate in the form of anhydrite, slag sand, fly ash, fumed silica, blast furnace slag, natural pozzolans, burnt oil shale and/or (Portland) cement, preference being given to the presence of (Portland) cement with a proportion greater than 40% by weight based on the total amount of the inorganic binder.

The object is also achieved by the use of the polycondensates according to this invention for the dispersion of inorganic binders, selected from the before mentioned group of binders. The object is also solved by the use of the polycondensates according to this invention for the reduction of the plastic viscosity of concrete and the use as a grinding aid in the production of cement.

The polycondensates according to this invention can be produced by polycondensation of aromatic monomers with formaldehyde, the aromatic monomers are converted to aromatic structural units (I), (II) and optionally (IV) during the polycondensation reaction. This polycondensation reaction is well known and is disclosed for example in the prior art documents WO 2006/042709 A1 and WO2010/040611 A1.

Naturally the molecular weight of the polymers is defined in part by the kind and amount of monomers used. Other factors independent from the set of monomers used, are the reaction time, the reaction temperature, the amount and type of acid catalyst. These factors have also an influence on the molecular weight $M_w$ and the PD value. In order to achieve a relatively low average molecular weight $M_w$ and low polycondensation degree PD, it is possible to adjust the reaction time (shorter) and temperature (lower). Without changing the aromatic monomers, it is also possible to fine tune (reduce) the molecular weight $M_w$ and polycondensation degree PD by reducing the amount of formaldehyde to under-stoichiometric amounts (90-100 mol-% of the sum of the molar amounts of all the aromatic monomers). Furthermore, it is also possible to fine tune (reduce) the molecular weight $M_w$ and polycondensation degree PD by reducing the amount of acid catalyst (e.g. sulphuric acid). Also combinations of all the above mentioned methods are possible.

With respect to structural unit (I) it has been proven to be advantageous to have a minimum polyether side chain length for achieving a reasonable dispersion effect in cementitious binder systems, in particular in concrete. Very short side chains become economically less favourable, because the dispersibility of the admixtures is low and the necessary dosage for achieving a dispersion effect becomes high, whereas too long polyether side chains of the polycondensate result in less good rheological properties of the concrete (high viscosity), prepared with these admixtures. The content of ethylene glycol units in the polyether side chain should be higher than 80 mol % with respect to all alkylene glycol units in the polyether side chain in order to allow sufficient solubility of the polycondensate products.

In the structural unit (I) the aromatic moiety bears one or more polyether side chains, preferably one polyether side chain. The structural units (I) are independently of one another identical or different. This means that one or several types of structural units (I) can be present in the polycondensate. For example the structural unit (I) can differ in the type of the polyether side chain and/or in the type of aromatic structure.

Structural unit (I) is derived from respective aromatic monomers which are aromatic monomers bearing a polyether side chain comprising alkylene glycol units and fulfilling the requirements with respect to the side chain length and the content of ethylene glycol in the side chain. Said monomers are incorporated into the polycondensate with the monomer formaldehyde and monomers resulting in structural units (II) when incorporated into the polycondensate by the polycondensation reaction. In particular the structural unit (I) is different to the aromatic monomer from which it is derived by the absence of two hydrogen atoms, which are abstracted from the monomer during the polycondensation reaction (formation of water with one oxygen atom from the formaldehyde).

The aromatic moiety in structural unit (I) is preferably a substituted or not substituted aromatic moiety bearing a polyether side chain according to this invention. It is possible that one or more than one polyether side chain(s), are present in the structural unit (I), preferably one or two polyether side chain(s) are present, most preferably one polyether side chain. "Substituted aromatic moiety" in this context means preferably any substitution other than the polyether side chain or the polyether side chains according to this invention. Preferably the substitution is a C1 to C10 alkyl group, most preferably a methyl group. The aromatic moiety can preferably have 5 to 10 atoms in the aromatic structure, preferably 5 to 6 carbon atoms in the aromatic structure; most preferably the aromatic structural unit has 6 carbon atoms and is benzene or a substituted derivative of benzene. The aromatic moiety in structural unit (I) can be also a heteroaromatic structure, including atoms different from carbon like oxygen (in furfuryl alcohol), but preferably the atoms of the aromatic ring structure are carbon atoms.

Examples for the structural unit (I) are expressed in the following as the respective monomers. For example, but not limited, in each case the according to this invention ethoxylated derivatives of the following aromatic alcohols and amines: phenol, cresol, resorcinol, catechol, hydroquinone, naphthol, furfuryl alcohol or aniline. Preferable is ethoxylated phenol. Resorcinol, catechol and hydroquinone bear preferably two polyether side chains. It is possible that resorcinol, catechol and hydroquinone bear also only one polyether side chain in each case. In each case it is possible that less than 20 mol % of alkylene glycol units are contained, which are not ethylene glycol units.

Preferably the structural units (I) are described by the following general formula (Ia):

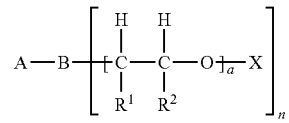

where
A are identical or different and are represented by a substituted or unsubstituted aromatic or heteroaromatic compound having 5 to 10 C atoms, preferably having 5 to 10 atoms in the aromatic structure, more preferably having 5 to 6 carbon atoms in the aromatic structure, most preferably having 6 carbon atoms in the aromatic ring structure and being benzene or a substituted derivative of benzene,
where
B are identical or different and are represented by N, NH or O,
where
n=2 if B=N and n=1 if B=NH or O
where
$R^1$ and $R^2$, independently of one another, are identical or different and are represented by a branched or straight-chain $C_1$- to $C_{10}$-alkyl radical, $C_5$- to $C_8$-cycloalkyl radical, aryl radical, heteroaryl radical or H, with the proviso that the number of ethylene glycol units ($R^1$ and $R^2$ are H) in the polyether side chain is from 9 to 41 and that the content of ethylene glycol units is higher than 80 mol % with respect to all alkylene glycol units in the polyether side chain,
where
a are identical or different and are represented by an integer from 12 to 50, preferably 9 to 35,
where
X are identical or different and are represented by a branched or straight-chain $C_1$- to $C_{10}$-alkyl radical, $C_5$- to $C_8$-cycloalkyl radical, aryl radical, heteroaryl radical or H, preferably H. In general formula (Ia) B is preferably O (oxygen).

$R^1$ and $R^2$ are preferably represented by H, methyl, ethyl or phenyl, particularly preferably by H or methyl and especially preferably by H.

The structural units (I) possess a relatively long hydrophilic polyether side chain, which additionally creates a steric repulsion between the on the surface of the cement particles adsorbed polycondensates. The dispersing effect is improved.

The structural unit (II) provides anionic groups in the polycondensate (from phosphoric acid ester in its acid or salt form), which interfere with the positive charge present on the surface of cement particles in an aqueous cementitious dispersion, which is strongly alkaline. Due to the electrostatic attraction the polycondensates adsorb on the surface of the cement particles and the cement particles are dispersed. The term phosphoric acid ester in this specification comprises preferably a mixture of phosphoric acid monoester $(PO(OH)_2(OR)_1)$, phosphoric acid diester $(PO(OH)(OR)_2)$ and/or phosphoric acid triester $(PO(OR)_3)$. Typically, the phosphoric acid triester is not comprised. The rest R defines the respective alcohol without the OH group, which reacts to the ester with the phosphoric acid. Preferably the rest R comprises an aromatic moiety. The monoester is typically the main product of the phosphorylation reaction.

The term phosphorylated monomer in this specification comprises the reaction product of an aromatic alcohol with phosphoric acid, polyphosphoric acid or phosphorous oxides of mixtures of phosphoric acid, polyphosphoric acid and phosphorous oxides.

Preferably the content of the phosphoric acid monoester is higher than 50 weight % with respect to the sum of all phosphoric acid esters. Preferably the contents of structural units (II) derived from a phosphoric acid monoester is higher than 50 weight % with respect to the sum of all structural units (II).

In the structural unit (II) the aromatic moiety bears preferably one phosphoric acid ester group and/or its salt. This means that a monoalcohol is preferably used. The structural unit (II) can also bear more than one phosphoric acid ester group and/or its salt, preferably two. In this case at least a dialcohol is used or a polyalcohol. The structural units (II) are independently of one another identical or different. This means that one or several types of structural units (II) can be present in the polycondensate.

Structural unit (II) in the polycondensate is an aromatic moiety bearing at least one phosphoric acid ester group and/or its salt, with the proviso that the molar ratio of (I) to (II) is from 0.3 to 4, preferably 0.4 to 3.5, more preferably 0.45 to 3, most preferably 0.45 to 2.5. This ratio is advantageous, because a sufficient initial dispersibility (relatively high content of structural unit (II)) and a sufficient slump-retention property (relatively high content of structural unit (I)) of the polycondensates in the concrete experiment can be achieved.

As was explained before for structural unit (I), also the structural unit (II) is different to the aromatic monomer from which it is derived by the absence of two hydrogen atoms, which are abstracted from the monomer during the polycondensation reaction.

The aromatic moiety in structural unit (II) is preferably a substituted or not substituted aromatic moiety bearing at least one phosphoric acid ester group and/or its salt. It is possible that one or more than one phosphoric acid ester group(s) and/or its salt are present in the structural unit (II), preferably one or two phosphoric acid ester group(s) and/or its salt are present, most preferably one phosphoric acid ester group and/or its salt. The aromatic moiety of structural unit (II) has preferably 5 to 10 atoms in the aromatic structure, preferably 5 to 6 carbon atoms in the aromatic structure, most preferably the aromatic structural unit has 6 carbon atoms and is benzene or a substituted derivative of benzene. The aromatic moiety in structural unit (I) can also be a heteroaromatic structure, including atoms different from carbon like oxygen (in furfuryl alcohol), but preferably the atoms in the aromatic ring structure are carbon atoms.

Preferably the monomer (II) is represented by the following general formula (IIa):

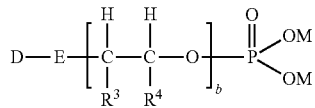

where
D are identical or different and are represented by a substituted or unsubstituted heteroaromatic compound having 5 to 10 C atoms, preferably having 5 to 10 atoms in the aromatic structure, more preferably having 5 to 6 carbon atoms in the aromatic structure, most preferably having 6 carbon atoms in the aromatic structure and being benzene or a substituted derivative of benzene,
where
E are identical or different and are represented by N, NH or O
where
m=2 if E=N and m=1 if E=NH or O
where
$R^3$ and $R^4$, independently of one another, are identical or different and are represented by a branched or straight-chain $C_1$- to $C_{10}$-alkyl radical, $C_5$- to $C_8$-cycloalkyl radical, aryl radical, heteroaryl radical or H, preferably H, more preferably $R^3$ and $R^4$ are both H,
where
b are identical or different and are represented by an integer from 0 to 10, preferably 1 to 5, more preferably 1 to 2, most preferably 1,
where M independently of one another is identical or different and is H or a cation equivalent. The phosphoric acid esters of general formula (IIa) can be an acid with two acid protons (M=H). The phosphoric acid esters can be also present in their deprotonated form in which case the proton is replaced by a cation equivalent. The phosphoric acid esters can also be partially deprotonated. The term cation equivalent means any metal cation or optionally substituted ammonium cation, which is able to replace the proton with the proviso that the molecules are electrically neutral. Preferably M is $NH_4$, an alkali metal or ½ earth alkali metal. In general formula (IIa) E is preferably O (oxygen).

Examples for the structural unit (II) are derived from the respective phosphorylated aromatic alcohol monomers and differ as was described in the before standing text by the abstraction of two hydrogen atoms from the respective monomer. For example, but not limited, structural units (II) are derived from the phosphorylation products of the following list of alcohols, respectively hydroquinones, in brackets the respective phosphorylated monomer (phosphoric acid ester with the alcohol) is indicated, which is deemed to be the main product of the phosphorylation reaction: phenoxyethanol (phenoxyethanol phosphate), phenoxydiglycol, (phenoxydiglycol phosphate) (methoxyphenoxy)ethanol ((methoxyphenoxy)ethanol phosphate), methylphenoxyethanol, (methylphenoxyethanol phosphate), bis (β-hydroxyethyl) hydroquinone ether, (bis(β-hydroxyethyl) hydroquinone ether phosphate and bis(β-hydroxyethyl) hydroquinone ether diphosphate) and nonylphenol (nonylphenol phosphate). More preferable are phenoxyethanol phosphate, phenoxydiglycol phosphate and bis(β-hydroxyethyl) hydroquinone ether diphosphate. Most preferable is phenoxyethanol phosphate. It is possible to use mixtures of the before mentioned monomers from which structural units (II) are derived.

It should be mentioned that typically during the phosphorylation reaction (e.g. reaction of the before mentioned aromatic alcohol(s) including hydroquinones with polyphosphoric acid) besides the before mentioned main products (monoester of phosphoric acid with one equivalent of aromatic alcohol ($PO(OH)_2(OR)_1$) also side products are formed. Said side products are in particular the diesters of phosphoric acid with two equivalents of the aromatic alcohol ($PO(OH)(OR)_2$) or the respective triesters ($PO(OR)_3$. The formation of triesters requires temperatures above 150° C. and is therefore usually not observed. R stands here for the aromatic alcohol structure without the OH group. It is possible that to some extent unreacted alcohol is present in the reaction mixture; the content is usually below 35 weight %, preferably lower than 5 weight % of the aromatic alcohol used. The main product (monoester) after the phosphorylation reaction is typically present in the reaction mixture at a level of higher than 50 weight %, preferably higher than 65 weight %, with respect to the aromatic alcohol used.

The groups A and D of the structural units (Ia) and (IIa) are represented by for example (not limited) phenyl, 2-methylphenyl, 3-methylphenyl, 4-methylphenyl, 2-methoxyphenyl, 3-methoxyphenyl, 4-methoxyphenyl, preferably phenyl, it is possible for A and D to be chosen independently of one another. Several types of A can be present in the polycondensate and several types of D can also be present in the polycondensate. The groups B and E, independently of one another, are preferably represented by O (oxygen).

The radicals $R^3$ and $R^4$ in general formula (IIa) can be chosen independently of one another and are preferably represented by H, methyl, ethyl or phenyl, particularly preferably by H or methyl and especially preferably by H.

The structural unit (III) is at least a methylene unit ($—CH_2—$), which is attached to two aromatic structural units Y, where aromatic structural units Y, independently of one another, are identical or different and are represented by structural unit (I), structural unit (II) or optionally (IV) aromatic structural units of the polycondensate, which are different from structural unit (I) and structural unit (II). The methylene unit is introduced by the reaction of formaldehyde under formation of water during the polycondensation. Preferably more than one methylene unit is contained in the polycondensate.

The aromatic structural units of the polycondensate (IV) are optional. It can be any aromatic structural unit, which is different from the structural units (I) and structural units (II). For example the structural unit (IV) can be derived from any aromatic monomer (abstraction of two hydrogen atoms), which is able to react in a polycondensation reaction with formaldehyde, like for example but not limited to: phenoxyethanol, phenol, naphthol, aniline, benzene-1, 2-diol, benzene-1, 2, 3-triol, 2-hydroxybenzoic acid, 2,3-dihydroxybenzoic acid, 3,4-dihydroxybenzoic acid, 3,4,5-trihydroxybenzoic acid, phthalic acid, 3-hydroxyphthalic acid, 1,2-dihydroxynaphthalene and 2,3-dihydroxynaphthalene.

The structural unit (IV) can be also similar to structural unit (I), but only differing in the number of ethylene glycol units in the side chain. Preferable is as structural unit (IV) at least a structural unit, which is an aromatic moiety bearing a polyether side chain comprising alkylene glycol units, with the proviso that the number of ethylene glycol units in the side chain is from 42 to 120 and that the content of ethylene glycol units is higher than 80 mol % with respect to all alkylene glycol units in the polyether side chain.

The polycondensation degree of the units (I), (II), (III) and optionally (IV) describes the length of the polymer backbone of the polycondensate, as it gives a value of the number of repeating units contained in the polycondensate. Details of the polycondensation degree are explained in the following text.

In contrast to this the average molecular weight $M_w$ of a polymer (usually determined by GPC measurement relative to a standard) does not consider the backbone length in particular, as the $M_w$ value reflects only the number and masses of each monomer contained in the polymer. For a given value $M_w$ the backbone length of the polymer can be long, if the mass of the monomers is low. On the other side the backbone length of a polymer can be short, even if $M_w$ is relatively high (high masses of the monomers). In particular a high $M_w$ value is not absolutely an indicator for a long backbone length of the polycondensate or a polymer in general. The average molecular weight $M_w$ allows only a conclusion to the backbone length for a given set of structural units (monomers).

It was found as a result of intensive investigations that polycondensates with relatively short, but not too short polyether side chains and a polycondensation degree in the range from 10 to 75 are especially effective dispersants for cementitious compositions and are in particular effective in improving the rheology of fresh concrete. Especially the viscosity of the concrete can be effectively reduced.

The polycondensation degree of the polycondensates containing the units (I), (II), (III) and optionally (IV) will be abbreviated for reasons of convenience as PD. The PD is calculated from the $M_w$ of the polycondensate and the analytically known ratios of the units (I) (II), (III) and optionally (IV) in the polycondensate according to the following formula:

$$PD=M_w/[(\Sigma_i(n_i \cdot M_i))/(\Sigma_i n_i)]$$

$$PD=M_w/[\text{average molecular weight of all structural units in the polycondensate}]$$

$M_w$ is the average molecular weight of the polycondensate as determined by GPC:

Column combination: OH-Pak SB-G, OH-Pak SB 804 HQ and OH-Pak SB 802.5 HQ by Shodex, Japan; eluent: 80 Vol.-% aqueous solution of $HCO_2NH_4$ (0.05 mol/l) and 20 Vol.-% acetonitrile; injection volume 100 μl; flow rate 0.5 ml/min. The molecular weight calibration was performed with poly(styrene sulfonate) standards for the UV detector and poly(ethylene oxide) standards for the RI detector. Both standards were purchased from PSS Polymer Standards Service, Germany. In order to determine the molecular weight of the polymers, the UV-detection at 254 nm wavelength was used, because the UV detector is only responsive towards the aromatic compounds and neglects inorganic impurities, that otherwise could falsify the results for the molecular weights.

$n_i$ is the number in mol of the structural units (I), (II), (III) and optionally (IV). The index i is an abbreviation of (I) to (IV). It is possible that various kinds of structural units (I), for example two or more types of structural unit (I) are present in the polycondensate. The same is true for structural units (II) and optionally (IV), whereas structural unit (III) is defined as a methylene group.

$M_i$ is the mass of structural units (I), (II), (III) and optionally (IV). The structural units (I), (II), (III) and optionally (IV) are introduced into the polycondensation product by a polycondensation reaction of formaldehyde with the aromatic monomers leading to structural units (I), (II) and (IV). In this well-known polycondensation reaction between the monomer formaldehyde and the aromatic monomers, water is formed and the formaldehyde is inserted between the aromatic units in the form of the structural unit methylene. Two hydrogen atoms are released from the respective aromatic monomers and form together with the oxygen from the monomer formaldehyde the water.

Therefore the mass of the aromatic structural units (I), (II) and optionally (IV) is the mass of the respective aromatic monomer used, minus 2 g/mol for the loss of 2H atoms abstracted from the monomer during the polycondensation reaction. The mass of the methylene unit $—CH_2—$ (structural unit (III)) is 14 g/mol.

For the calculation of the polycondensation degree (PD) the respective product of mol number $n_i$ and mass of the respective structural unit $M_i$ ($\Sigma_i(n_i \cdot M_i)$) has to be calculated.

This is possible from respective analytical results of the polycondensate. It is defined for the calculation that the sum of the mol numbers of all aromatic units (I), (II) and optionally (IV) gives the mol number of structural unit (III). This is due to the fact that in between the aromatic units one methylene group is introduced. It should also be mentioned that in the case that for example more than one type of structural unit (I) is present in the polycondensate, it will be necessary to build the sum of $(\Sigma_i(n_i \cdot M_i))$ for each type of structural unit (I). The same is true for structural units (II) and optionally structural units (IV) in an analogous way.

The mathematical term $[(\Sigma_i(n_i \cdot M_i))/(\Sigma_i n_i)]$ is furthermore an indication of the average molecular weight of all the structural units (in particular (I), (II), (III) and optionally (IV)) contained in the polycondensate. Said value depends in particular from the mol numbers of each monomer and their respective mass. In this context it should be kept in mind that for the calculation of the molecular mass of structural units (II), respectively from the monomers (II), the acid form of the phosphoric acid ester has to be considered and not its salt form. For example in the case of the monomer phenoxyethanol phosphate, which is the product of esterification between 1 mol of phosphoric acid and 1 mol of phenoxyethanol ($C_8H_{11}O_5P$) the mass is 218 g/mol, even if actually the sodium salt ($C_8H_9Na_2O_5P$) might have been used, which would have a higher molecular weight. The same calculation is also to be used for optional structural units (IV), which can form a salt due to the presence of acidic functional groups (e.g. phenol in the form of its phenolate salt), also for phosphoric acid diesters if present.

The division of $M_w$ with said value $[(\Sigma_i(n_i \cdot M_i))/(\Sigma_i n_i)]$, which is the average molecular weight of all the structural units, gives an average value of the number of repeating units contained in the polycondensate (=polycondensation degree (PD)). This value is a measure and characteristic for the length of the backbone of the polycondensate.

As examples for the calculation of the PD value the following cases are given:

1. Example:

The molar ratio of structural units of the general formula (I) (as the sum of two types) to general formula (II) is 2/1. The molecular weight of the first type of structural unit (I) is 500 g/mol, the molecular weight of the second type of structural unit (I) is 1,000 g/mol, the molar ratio of the two types of monomers (I) is 1/1. The molecular weight of (II) is 200 g/mol and the molecular weight of the polycondensate is 20,000 g/mol (by GPC).

The mol number of methylene groups from formaldehyde is equal to the sum of the mol numbers of all aromatic structural units (I) and (II). A structural unit (IV) is not present.

$PD = M_w/[(\Sigma_i(n_i \cdot M_i))/(\Sigma_i n_i)]$

In this case the PD value would be 68.9=20,000 g/mol/[(1 mol·500 g/mol+1 mol·1,000+1 mol·200 g/mol+3 mol·14 g/mol)/(1 mol+1 mol+1 mol+3 mol)].

2. Example (Example B1 of WO 2006/042709 A1)

$M_w$=22,000 g/mol

Monomer (I): ethoxylated phenol with mass 1,000 g/mol (=998 g/mol as structural unit (I)).

Monomer (II): phenoxyethanol phosphoric acid ester with mass 218 g/mol (=216 g/mol as structural unit (II)).

Molar ratio of monomer (I)/(II)=½. A structural unit (IV) is not present.

PD=22,000 (g/mol)/[(1·998g+2·216g+3·14 g)/(1 mol+2 mol+3 mol)]

PD=89.7

3. Example (Example B3 of WO 2006/042709 A1)

$M_w$=20,000 g/mol

Monomer (I): ethoxylated phenol with mass 1.000 g/mol (=998 g/mol as structural unit (I)).

Monomer (II): phenoxyethanol phosphate with mass 218 g/mol (=216 g/mol as structural unit (II)). The molar ratio of monomer (I)/(II)=½.

An additional monomer (IV) phenol is present in the molar ratio monomer (I)/monomer (IV)=0.5. Phenol has the mass 94.1 g/mol (=92.1 g/mol as structural unit (IV)).

PD=20,000 (g/mol)/[(1·998+2·216+3.5·14+0.5·92.1)·(g)/(1+2+3.5+0.5) (mol)]

PD=91.8

The PD is a number without units and due to the fact that it is an average value, it can be also a broken number. Therefore it could be also called a value for the average of an assembly of polymers with the average molecular weight M. Of course when looking at one specific polycondensate structure, only integral numbers are possible for the number of repeating units, because a broken number of monomers in a single polymer is not possible.

Chemically, the PD value is an indicator of how many units (I), (II), (Ill) and optionally (IV) are present in the polycondensate on average. In particular the PD value indicates the backbone length of the polycondensate.

Preferably the number of ethylene glycol units in the polyether side chain of structural unit (I) is from 9 to 41, preferably from 9 to 35, more preferably from 12 to 23. It has been found that shorter polyether side chain lengths contribute to the good rheological behaviour of concrete prepared with the polycondensates according to this invention. In particular low plastic viscosities of the concrete produced with the polycondensates can be obtained. Too short side chains become less economically interesting, as the dispersion effect decreases and the dosage needed for obtaining a certain level of workability (e.g. slump in the concrete test) increases.

Preferably the average molecular weight of the polycondensate is from 5,000 g/mol to 25,000 g/mol, more preferably from 8,000 g/mol to 22,000 g/mol, most preferably from 10,000 g/mol to 19,000 g/mol. The range of $M_w$, from 5,000 g/mol to 25,000 g/mol indicates a further preferable limitation in addition to the claimed range of the polycondensation degree (PD). It was explained in the before standing text that it is not so much the average molecular weight $M_w$, which is decisive for the good rheological properties of concrete, but the polycondensation degree (PD). However there are preferable narrower ranges of $M_w$, where the dispersibility and rheological behaviour in concrete are better.

It should be mentioned that the masses of the structural units (I) and (II), optionally (IV), their respective mol numbers and the average molecular weight $M_w$ of the polycondensate have to be selected in a way that the polycondensation degree PD is within the claimed range according to this invention. This is a relatively simple calculation as has been shown in the calculation examples in the before standing text. The polycondensation degree can be calculated and is determined in a non-ambiguous way by the parameters $M_w$, $n_i$ and $M_i$, $n_i$ meaning the mol numbers of all structural units and M, meaning the mass of all structural units. Upper and lower limits for $M_w$, $n_i$ and $M_i$ are disclosed in this specification. There are many possibilities for combination of the values (numbers) of the before mentioned parameters. It is not the case that all the manifold combination possibilities of the values of the before mentioned features ($M_w$, $n_i$ and $M_i$) result always in a polycondensation degree (PD) within the claimed range of 10 to 75.

As mentioned before the combination of said parameters has to be selected in a way that the claimed PD range is obtained. For example for a fixed set of monomers, respectively structural units in the polycondensate (type and molar ratio is decided) only a certain range of $M_w$ might be possible, which might then be less broad than the total disclosed range of 5,000 g/mol to 25,000 g/mol, in order to fulfil the feature of a PD value from 10 to 75. So the set of monomers, which determines the average molecular weight of all the structural units as was shown before, has an influence on the range of possible values $M_w$ and vice versa.

Preferable are polycondensate in which the structural unit (I) is derived from an alkoxylated aromatic alcohol monomer bearing a hydroxyl group at the end of the polyether side chain.

Preferable are polycondensate in which the structural unit (II) is derived from an aromatic alcohol monomer, which was in a first step alkoxylated and the obtained alkoxylated aromatic alcohol monomer bearing a hydroxyl group at the end of the polyether side chain was in a second step phosphorylated to the phosphoric acid ester group.

Preferable is a polycondensate in which the structural unit (I) is a phenyl poly alkylene glycol. Phenyl poly alkylene glycols are relatively easy to obtain and economically viable, also the reactivity of the aromatic compound is rather good.

Preferably the structural unit (I) is a phenyl poly alkylene glycol according to the general formula (V)

—[C$_6$H$_3$—O-(AO)$_n$—H]—,  (V)

n is an integer from 9 to 41, preferably from 9 to 35, more preferably from 12 to 23, A is an alkylene with 2 to 5 carbon atoms, preferably 2 to 3 carbon atoms, with the proviso that the content of ethylene glycol units (A=ethylene) is higher than 80 mol %, preferably higher than 85 mol %, more preferably higher than 90 mol %, most preferably higher than 95 mol %, with respect to all alkylene glycol units in the polyether side chain (AO)$_n$.

The substitution pattern on the aromatic benzene unit (C$_6$H$_3$ in the above general formula (V)) is due to the activating effect (electron donating effect) of the oxygen atom attached to the benzene ring mainly in the ortho (2-position) and para substitution (4-position) with respect to the position of said oxygen atom attached to the benzene ring (1-position). The meta position is less preferred.

Preferable is a polycondensate in which the structural unit (II) is selected from the group of alkoxylated phenol phosphoric acid esters or alkoxylated hydroquinone phosphoric acid esters according to the following general structures (VI) and/or (VII),

—[C$_6$H$_3$—O-(AO)$_n$—PO$_3$M$_2$]-,  (VI)

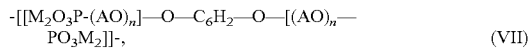
-[[M$_2$O$_3$P-(AO)$_n$]—O—C$_6$H$_2$—O—[(AO)$_n$—PO$_3$M$_2$]]-,  (VII)

n is in both formulae an integer from 1 to 5, preferably 1 to 2, most preferably 1, A is in both formulae an alkylene with 2 to 5, preferably 2 to 3 carbon atoms, M independently of one another is identical or different and is H or a cation equivalent. Preferably A is ethylene.

The esters of general formula (VI) or (VII) can be an acid with two acid protons (M=H). The esters can be also present in their deprotonated form in which case the proton is replaced by a cation equivalent. The esters can also be partially deprotonated. The term cation equivalent means any metal cation or optionally substituted ammonium cation, which is able to replace the proton with the proviso that the molecules of general structure (VI) and (VII) are electrically neutral. Therefore for example in the case of an earth alkali metal with two positive charges there must be a factor of ½ in order to assure neutrality (½ earth alkali metal), in the case of Al$^{3+}$ as the metal component M would have to be ⅓ Al. Mixed cation equivalents with for example two or more types of metal cations are also possible. Preferably M is NH$_4$, an alkali metal or ½ earth alkali metal.

Alkoxylated phenol phosphoric acid esters or alkoxylated hydroquinone phosphoric acid esters are relatively easy to obtain and economically viable, also the reactivity of the aromatic compounds in the polycondensation reaction is rather good.

Preferable are polycondensates in which the molar ratio of ethylene glycol units from structural units (I) to phosphoric acid ester units from structural unit (II) is from 11 to 40. More preferably the molar ratio of ethylene glycol units from structural units (I) to phosphoric acid ester units from structural unit (II) is from 12 to 35, most preferably from 13 to 30. In order to determine said ratio the sum of all ethylene glycol units from structural units (I) is calculated. It is possible that different types of structural units (I) are present.

When considering the values of the independent claim and calculating therefrom the molar ratio of ethylene glycol units from structural units (I) to phosphoric acid ester units from structural unit (II), the minimum of 9 and maximum of 41 alkylene glycols in the structural unit (I), combined with the molar ratio of structural units (I) to structural units (II) of 0.3 to 4 results in a minimum value of 9/8 (short side chain of 9 EOs combined with the molar ratio of (I)/(II)=4 and considering the possibility that 2 phosphoric acid ester groups can be present in (II)). A maximum value of 136.7 (41/0.3) follows when considering the long side chain of 41 EOs combined with the molar ratio of (I)/(II)=0.3 and one phosphoric acid ester being present in (II). At the lower limit of 9/8 the phosphate ester groups are abundant, so that the slump-retention in the concrete experiment will be less good. On the other side the higher limit of 136.7 provides polycondensates, which are not so good with respect to their water reduction properties (initial water reduction in the concrete experiment) because the adsorption to the cement particles is too weak. It has been found that the before mentioned preferable ranges provide an adequate balance between the two before mentioned properties in the concrete experiment, which means a good water reduction and good slump-retention. Also the viscosity of the concrete is low.

Preferable are polycondensates in which the molar ratio of the sum of structural units (I) and (II) to the structural units (IV) is higher than 1/1, preferably higher than 2/1, more preferably higher than 3/1, most preferably higher than 5/1. Most preferably no structural unit (IV) is contained in the polycondensate.

It is preferable that the proportion of optional structural units (IV), which are different from structural units (I) and (II), is not too high in order to achieve sufficient dispersibility and good rheological properties of the concrete made with the polycondensates according to this invention. This means in other words that preferably more than half of the aromatic structural units are in sum of the structural unit (I) and (II) type. In each case several types of structural units (I) or (II) can be present in the polycondensate. The optional structural units (IV), depending on their type, may not contribute very strongly to the dispersibility of the polycondensate in concrete, but the backbone length of the polycondensate becomes longer, therefore the content of structural units (IV) is preferably limited.

Preferable is a polycondensate in which the molar ratio of the sum of structural units (I) and (II) to structural unit (IV) is lower than 10/1, preferably lower than 8/1, more preferably lower than 5/1, and the structural unit (IV) is an aromatic moiety bearing a polyether side chain comprising alkylene glycol units, with the proviso that the number of ethylene glycol units in the side chain of structural unit (IV) is from 42 to 120, preferably 42 to 100, more preferably 42 to 50, and that the content of ethylene glycol units is higher than 80 mol %, preferably higher than 85 mol %, more preferably higher than 90 mol %, most preferably higher than 95 mol % with respect to all alkylene glycol units in the polyether side chain of structural unit (IV).

More preferable is a polycondensate in which the molar ratio of the sum of structural units (I) and (II) to structural unit (IV) is lower than 5/1 and the structural unit (IV) is an aromatic moiety bearing a polyether side chain comprising alkylene glycol units, with the proviso that the number of ethylene glycol units in the side chain of structural unit (IV) is from 42 to 50, and that the content of ethylene glycol units is higher than 80 mol % with respect to all alkylene glycol units in the polyether side chain of structural unit (IV).

The structural units (IV) with a polyether side chain length higher than 41 ethylene glycol units actually provide additional dispersibility to the polycondensate and are therefore preferable compared to other structural units without polyether side chains, like for example phenol. However the contents should not be too high in order to preserve the good rheological properties of the concrete. It should be mentioned that the range of possible $M_w$ values will turn to higher values if the average molecular weight of all structural units increases due to the presence of structural units (IV) with long polyether side chains and therefore higher mass. This is preferable in order to compensate (the rheology may become slightly worse compared to polycondensates without structural units (IV)) for the introduced long polyether side chains and in order to fulfil the condition of the claimed polycondensation degree (PD).

Preferable are polycondensates in which the molar ratio of the sum of structural units (I) and (II) to the structural units (III) is from 0.8/1 to 1/0.8, more preferably 0.9/1 to 1/0.9, most preferably said ratio is 1/1.

Preferable are polycondensates according to this invention in a formulation together with further dispersants selected from the group of a) sulfonated melamine-formaldehyde condensates, b) lignosulfonates, c) sulfonated ketone-formaldehyde condensates, d) sulfonated naphthalene-formaldehyde condensates (BNS), e) polycarboxylate ethers (PCE), f) non-ionic copolymers for extending workability to a cementitious mixture containing hydraulic cement and water, wherein the copolymer comprises residues of at least the following monomers: Component A comprising an ethylenically unsaturated carboxylic acid ester monomer comprising a moiety hydrolysable in the cementitious mixture, wherein the hydrolysed monomer residue comprises an active binding site for a component of the cementitious mixture; and Component B comprising an ethylenically unsaturated, carboxylic acid ester or alkenyl ether monomer comprising at least one $C_{2-4}$ oxyalkylene side group of 1 to 350 units or g) phosphonate containing dispersants according to the following formula R—(OA)$_n$-N—[CH$_2$—PO(OM$_2$)$_2$]$_2$ whereby R is H or a saturated or unsaturated hydrocarbon rest, preferably a C1 to C15 alkyl radical, A is the same or different and independently from each other an alkylene with two to 18 carbon atoms, preferably ethylene and/or propylene, most preferably ethylene, n is an integer from 5 to 500, preferably 10 to 200, most preferably 10 to 100 and M is H, an alkali metal, ½ earth alkali metal and/or an amine and whereby any combination of the before standing further dispersants a) to g) is possible.

The polycondensates according to this invention are dispersants for inorganic binders, especially for cementitious mixtures like concrete or mortar. It is possible to use the polycondensates according to this invention also in a formulation with further dispersants for inorganic binders, preferably dispersants a) to g) as mentioned in the before standing text.

When the polycondensates according to this invention are present in a formulation together with further dispersants, preferably with at least one of the dispersants a) to g), it is preferable that the weight ratio, in terms of solid content, of the polycondensates according to this invention to the sum of the weights of at least one of the further dispersants is preferably higher than 1/4, more preferably higher than 1/3, most preferably higher than 2/3.

The dosage of the sum of the polycondensates according to this invention and the further dispersant(s) in weight % of cement is from 0.1 to 2%, preferably 0.2 to 1%.

The a) sulfonated melamine-formaldehyde condensates, which can be used as dispersant in a formulation with the polycondensates according to this invention are of the kind frequently used as plasticizers for hydraulic binders (also referred to as MFS resins). Sulfonated melamine-formaldehyde condensates and their preparation are described in, for example, CA 2 172 004 A1, DE 44 11 797 A1, U.S. Pat. Nos. 4,430,469, 6,555,683 and CH 686 186 and also in Ullmann's Encyclopedia of Industrial Chemistry, 5$^{th}$ Ed., vol. A2, page 131, and Concrete Admixtures Handbook—Properties, Science and Technology, 2$^{nd}$ Ed., pages 411, 412. Preferred sulfonated melaminesulfonate-formaldehyde condensates encompass (greatly simplified and idealized) units of the formula

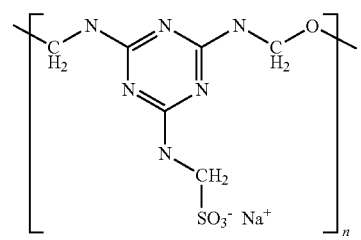

Melamine formaldehyde sulfite (MFS)

in which n stands generally for 10 to 300. The molar weight is situated preferably in the range from 2500 to 80,000. An example of melaminesulfonate-formaldehyde condensates are the products sold by BASF Construction Solutions GmbH under the Melment® name. Additionally to the sulfonated melamine units it is possible for other monomers to be incorporated by condensation. Particularly suitable is urea. Moreover, further aromatic units as well may be incorporated by condensation, such as gallic acid, aminobenzenesulfonic acid, sulfanilic acid, phenolsulfonic acid, aniline, ammoniobenzoic acid, dialkoxybenzenesulfonic acid, dialkoxybenzoic acid, pyridine, pyridinemonosulfonic acid, pyridinedisulfonic acid, pyridinecarboxylic acid and pyridinedicarboxylic acid, for example.

The b) lignosulfonates, which can be used as dispersant together with the polycondensates according to this invention in a formulation, are products which are obtained as by-products in the paper industry. They are described in Ullmann's Encyclopedia of Industrial Chemistry, 5$^{th}$ Ed., vol. A8, pages 586, 587. They include units of the highly simplified and idealizing formula

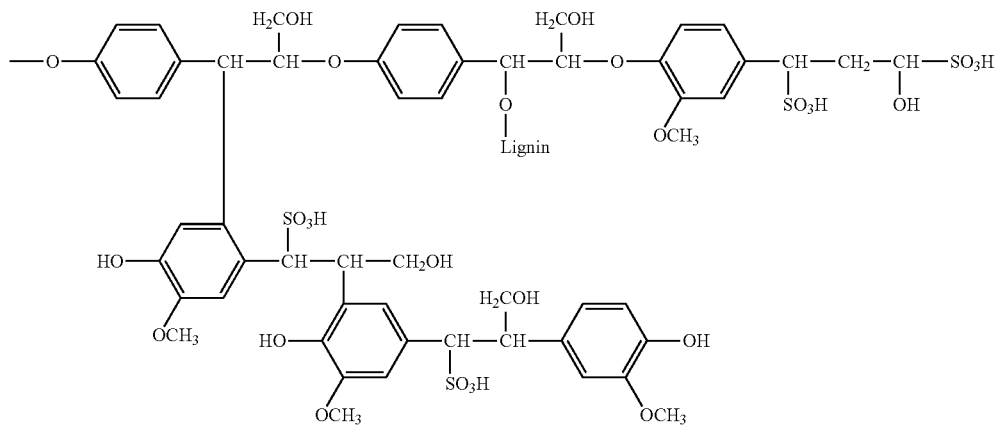

where n stands generally for 5 to 500. Lignosulfonates have molar weights of between 2000 and 100,000 g/mol. In general they are present in the form of their sodium, calcium and/or magnesium salts. Examples of suitable lignosulfonates are the products from the Norwegian company Borregaard LignoTech that are sold under the Borresperse commercial designation.

The c) sulfonated ketone-formaldehyde condensates, which can be used as dispersant together with the polycondensates according to this invention in a formulation, are products incorporating a monoketone or diketone as ketone component, preferably acetone, butanone, pentanone, hexanone or cyclohexanone. Condensates of this kind are known and are described in WO 2009/103579, for example. Sulfonated acetone-formaldehyde condensates are preferred. They generally comprise units of the formula (according to J. Plank et al., J. Appl. Poly. Sci. 2009, 2018-2024:

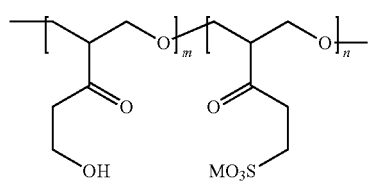

where m and n are generally each 10 to 250, M is an alkali metal ion, such as Na$^+$, and the ratio m:n is in general in the range from about 3:1 to about 1:3, more particularly about 1.2:1 to 1:1.2. Examples of suitable acetone-formaldehyde condensates are the products sold by BASF Construction Solutions GmbH under the Melcret K1L commercial designation. Furthermore, it is also possible for other aromatic units to be incorporated by condensation, such as gallic acid, aminobenzenesulfonic acid, sulfanilic acid, phenolsulfonic acid, aniline, ammoniobenzoic acid, dialkoxybenzenesulfonic acid, dialkoxybenzoic acid, pyridine, pyridinemonosulfonic acid, pyridinedisulfonic acid, pyridinecarboxylic acid and pyridinedicarboxylic acid, for example.

The d) sulfonated naphthalene-formaldehyde, which can be used as dispersant together with the polycondensates according to this invention in a formulation are products obtained by sulfonation of naphthalene and subsequent polycondensation with formaldehyde. They are described in references including Concrete Admixtures Handbook—Properties, Science and Technology, 2$^{nd}$ Ed., pages 411-413 and in Ullmann's Encyclopedia of Industrial Chemistry, 5$^{th}$ Ed., vol. A8, pages 587, 588. They comprise units of the formula

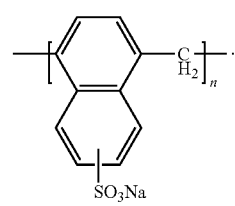

Typically, molar weights (Mw) of between 1000 and 50 000 g/mol are obtained. Examples of suitable β-naphthalene-formaldehyde condensates are the BASF Construction Solutions GmbH products sold under the Melcret 500 L commercial designation.

Furthermore, it is also possible for other aromatic units to be incorporated by condensation, such as gallic acid, aminobenzenesulfonic acid, sulfanilic acid, phenolsulfonic acid, aniline, ammoniobenzoic acid, dialkoxybenzenesulfonic acid, dialkoxybenzoic acid, pyridine, pyridinemonosulfonic acid, pyridinedisulfonic acid, pyridinecarboxylic acid and pyridinedicarboxylic acid, for example.

The e) polycarboxylate ethers (PCE) are polymers comprising polyether side chains, anionic groups or anionogenic groups, whereby anionic and anionogenic groups can be comprised in polycarboxylate ether. Anionic groups are the deprotonated acid groups in the polymeric dispersant. Anionogenic groups are the acid groups present in the polymeric dispersant, which can be transformed to the respective anionic group under alkaline conditions. Preferably the anionic groups are carboxylate groups and/or phosphate groups and the anionogenic groups are carboxylic acid groups and/or phosphoric acid groups.

Preferably the polyether side chains in the polycarboxylate ethers are polyalkylene glycol side chains, more preferably polyethylene glycol side chains with a side chain length of 1 to 350 alkylene glycol units, preferably 10 to 150 units, most preferably 20 to 100 units.

Typically the polycarboxylates are obtained from a radical polymerization of suitable ethylenically unsaturated acid monomers (respectively their salts), or in other words monomers bearing anionic and/or anionogenic groups, and monomers bearing polyalkylene glycol side chains.

The polycarboxylates contain ethylenically unsaturated acid monomers (respectively their salts), or in other words monomers bearing anionic and/or anionogenic groups, and monomers bearing polyalkylene glycol side chains. Optionally it is possible that also ethylenically unsaturated carboxylic acid ester monomers, which comprise a moiety hydrolysable in the cementitious mixture, wherein the hydrolysed monomer residue comprises an active binding site for a component of the cementitious mixture, are contained in the polycarboxylates. Examples for such monomers (component A) are acrylic acid ester monomers, more preferably hydroxyalkyl acrylic monoesters and/or hydroxyalkyl diesters, most preferably hydroxypropyl acrylate and/or hydroxyethyl acrylate.

The molar ratio of acid monomer to monomer bearing polyalkylene glycol side chains varies from 1/3 to about 10/1, preferably 1/3 to 5/1, more preferably 1/3 to 2/1. When the ratio of polyalkylene glycol side chain bearing monomers to acid monomers is relatively high, it is possible to obtain polycarboxylate ethers with slump-retaining properties, which is preferable in the use together with the dispersants according to this invention.

Generally it is possible to use the same type of unsaturated acid monomers (respectively their salts) or different types, the same is true for the monomers bearing polyalkylene glycol side chains.

Examples of ethylenically unsaturated monomers bearing polyether side chains in the polycarboxylate ethers (and also as component B of the dispersants f) or f-1)) include unsaturated monocarboxylic acid ester derivatives such as polyethylene glycol mono(meth)acrylate, polypropylene glycol (meth)acrylate, polybutylene glycol (meth)acrylate, polyethylene glycol polypropylene glycol mono(meth)acrylate, polyethylene glycol polybutylene glycol mono(meth)acrylate, polypropylene glycol polybutylene glycol mono(meth)acrylate, polyethylene glycol polypropylene glycol polybutylene glycol mono(meth)acrylate, methoxypolyethylene glycol mono(meth)acrylate, methoxypolypropylene glycol mono(meth)acrylate, methoxypolybutylene glycol mono(meth)acrylate, methoxypolyethylene glycol polypropylene glycol mono(meth)acrylate, methoxypolyethylene glycol polybutylene glycol mono(meth)acrylate, methoxypolypropylene glycol polybutylene glycol mono(meth)acrylate, methoxypolyethylene glycol polypropylene glycol polybutylene glycol mono(meth)acrylate, ethoxypolyethylene glycol mono(meth)acrylate, ethoxypolypropylene glycol mono(meth)acrylate, ethoxypolybutylene glycol mono(meth)acrylate, ethoxypolyethylene glycol polypropylene glycol mono(meth)acrylate, ethoxypolyethylene glycol polybutylene glycol mono(meth)acrylate, ethoxypolypropylene glycol polybutylene glycol mono(meth)acrylate, ethoxypolyethylene glycol polypropylene glycol polybutylene glycol mono(meth)acrylate, and higher alkoxy derivatives of the above mentioned polyoxyalkylenes;

vinyl alcohol derivatives such as polyethylene glycol mono(meth)vinyl ether, polypropylene glycol mono(meth)vinyl ether, polybutylene glycol mono(meth)vinyl ether, polyethylene glycol polypropylene glycol mono(meth)vinyl ether, polyethylene glycol polybutylene glycol mono(meth)vinyl ether, polypropylene glycol polybutylene glycol mono(meth)vinyl ether, polyethylene glycol polypropylene glycol polybutylene glycol mono(meth)vinyl ether, methoxypolyethylene glycol mono(meth)vinyl ether, methoxypolypropylene glycol mono(meth)vinyl ether, methoxypolybutylene glycol mono(meth)vinyl ether, methoxypolyethylene glycol polypropylene glycol mono(meth)vinyl ether, methoxypolyethylene glycol polybutylene glycol mono(meth)vinyl ether, methoxypolypropylene glycol polybutylene glycol mono(meth)vinyl ether, methoxypolyethylene glycol polypropylene glycol polybutylene glycol mono(meth)vinyl ether, ethoxypolyethylene glycol mono(meth)vinyl ether, ethoxypolypropylene glycol mono(meth)vinyl ether, ethoxypolybutylene glycol mono(meth)vinyl ether, ethoxypolyethylene glycol polypropylene glycol mono(meth)vinyl ether, ethoxypolyethylene glycol polybutylene glycol mono(meth)vinyl ether, ethoxypolypropylene glycol polybutylene glycol mono(meth)vinyl ether, ethoxypolyethylene glycol polypropylene glycol polybutylene glycol mono(meth)vinyl ether, and the like;

(meth)allyl alcohol derivatives such as polyethylene glycol mono(meth)allyl ether, polypropylene glycol mono(meth)allyl ether, polybutylene glycol mono(meth)allyl ether, polyethylene glycol polypropylene glycol mono(meth)allyl ether, polyethylene glycol polybutylene glycol mono(meth)allyl ether, polypropylene glycol polybutylene glycol mono(meth)allyl ether, polyethylene glycol polypropylene glycol polybutylene glycol mono(meth)allyl ether, methoxypolyethylene glycol mono(meth)allyl ether, methoxypolypropylene glycol mono(meth)allyl ether, methoxypolybutylene glycol mono(meth)allyl ether, methoxypolyethylene glycol polypropylene glycol mono(meth)allyl ether, methoxypolyethylene glycol polybutylene glycol mono(meth)allyl ether, methoxypolypropylene glycol polybutylene glycol mono(meth)allyl ether, methoxypolyethylene glycol polypropylene glycol polybutylene glycol mono(meth)allyl ether, ethoxypolyethylene glycol mono(meth)allyl ether, ethoxypolypropylene glycol mono(meth)allyl ether, ethoxypolybutylene glycol mono(meth)allyl ether, ethoxypolyethylene glycol polypropylene glycol mono(meth)allyl ether, ethoxypolyethylene glycol polybutylene glycol mono(meth)allyl ether, ethoxypolypropylene glycol polybutylene glycol mono(meth)allyl ether, ethoxypolyethylene glycol polypropylene glycol polybutylene glycol mono(meth)allyl ether, and the like;

adducts of 1 to 350 moles of alkylene oxide with an unsaturated alcohol such as 3-methyl-3-buten-1-ol, 3-methyl-2-buten-1-ol, 2-methyl-3-buten-2-ol, 2-methyl-2-buten-1-ol, and 2-methyl-3-buten-1-ol, either alone respectively or in combinations with each other, including but not limited to polyethylene glycol mono (3-methyl-3-butenyl) ether, polyethylene glycol mono (3-methyl-2-butenyl) ether, polyethylene glycol mono (2-methyl-3-butenyl) ether, polyethylene glycol mono (2-methyl-2-butenyl) ether, polyethylene glycol mono (1,1-dimethyl-2-propenyl) ether, polyethylene polypropylene glycol mono (3-methyl-3-butenyl) ether, polypropylene glycol mono (3-methyl-3-butenyl) ether, methoxypolyethylene glycol mono (3-methyl-3-butenyl) ether, ethoxypolyethylene glycol mono (3-methyl-3-butenyl) ether, 1-propoxypolyethylene glycol mono (3-methyl-3-butenyl) ether, cyclohexyloxypolyethylene glycol mono (3-methyl-3-butenyl) ether, 1-ocyloxypolyethylene glycol mono (3-methyl-3-butenyl) ether, nonylalkoxypolyethylene glycol mono (3-methyl-3-butenyl) ether, laurylalkoxypolyethylene glycol mono (3-methyl-3-butenyl) ether, stearylalkoxypolyethylene glycol mono (3-methyl-3-butenyl) ether, and phenoxypolyethylene glycol mono (3-methyl-3-butenyl) ether, and the like. The before standing list of examples for ethylenically unsaturated monomers bearing polyether side chains, respectively bearing polyalkylene glycol side chains applies also for the component B, which is comprised in the dispersants f) or f-1). Preferable is that at least 80 weight % of the $C_{2-4}$ oxyalkylene groups are $C_2$ oxyalkylene groups (ethylene groups).

Examples of suitable ethylenically unsaturated acid monomers are hydroxyethyl (meth)acrylate phosphoric acid ester (HE(M)A-phosphate), hydroxypropyl (meth)acrylate phosphoric acid ester (HP(M)A-phosphate), hydroxybutyl (meth)acrylate phosphoric acid ester (HB(M)A-phosphate), (meth)acrylic acid, maleic acid, maleic anhydride, crotonic acid, fumaric acid, citraconic acid, itaconic acid, monoesters of maleic acid or any mixture of a plurality of these components. Most preferable are acrylic acid, methacrylic acid and maleic acid, respectively maleic anhydride, which hydrolyses to maleic acid under aqueous alkaline conditions. In each case it is possible to use also the salts of the before mentioned acid monomers.

Examples of suitable polycarboxylate dispersants, which are also often called comb polymers, can be found in U.S. Publication No. 2002/0019459 A1, U.S. Publication No. 2006/0247402 A1, U.S. Pat. Nos. 6,267,814, 6,290,770, 6,310,143, 6,187,841, 5,158,996, 6,008,275, 6,136,950, 6,284,867, 5,609,681, 5,494,516, 5,674,929, 5,660,626, 5,668,195, 5,661,206, 5,358,566, 5,162,402, 5,798,425, 5,612,396, 6,063,184, 5,912,284, 5,840,114, 5,753,744, 5,728,207, 5,725,657, 5,703,174, 5,665,158, 5,643,978, 5,633,298, 5,583,183, 6,777,517, 6,762,220, 5,798,425, 5,393,343 and WO 2010/026155.

The dispersants f) are non-ionic copolymers for extending workability to a cementitious mixture containing hydraulic cement and water, wherein the copolymer comprises residues of at least the following monomers:

Component A comprising an ethylenically unsaturated carboxylic acid ester monomer, preferably acrylic acid ester monomer, more preferably hydroxyalkyl acrylic monoester and/or hydroxyalkyl diester, most preferably hydroxypropyl acrylate and/or hydroxyethyl acrylate, comprising a moiety hydrolysable in the cementitious mixture, wherein the hydrolysed monomer residue comprises an active binding site for a component of the cementitious mixture; and Component B comprising an ethylenically unsaturated, carboxylic acid ester or alkenyl ether monomer comprising at least one $C_{2-4}$ oxyalkylene side group of 1 to 350 units, preferably of 10 to 120 units, more preferably of 10 to 70 units. Preferable is that at least 80 weight % of the $C_{2-4}$ oxyalkylene groups are $C_2$ oxyalkylene groups (ethylene groups).

Examples of ethylenically unsaturated monomers capable of forming hydrolysable monomer residues comprising Component A, which can be used in the dispersant f) as well as f-1), that can be copolymerized include but are not limited to unsaturated monocarboxylic acid ester derivatives such as alkyl acrylates such as methyl acrylate, ethyl acrylate, propyl acrylate, and butyl acrylate; alkyl methacrylates such as methyl methacrylate, ethyl methacrylate, propyl methacrylate, and butyl methacrylate; hydroxyalkyl acrylates such as hydroxyethyl acrylate, hydroxypropyl acrylate, and hydroxybutyl acrylate; hydroxyalkyl methacrylates such as hydroxyethyl methacrylate, hydroxypropyl methacrylate, and hydroxybutyl methacrylate; acrylamide, methacrylamide, and derivatives thereof; maleic acid alkyl or hydroxyalkyl diesters; maleic anhydride or maleimide for copolymers to be stored in the dry phase. Preferable are alkyl acrylates such as methyl acrylate, ethyl acrylate, propyl acrylate, and butyl acrylate, hydroxyalkyl acrylates such as hydroxyethyl acrylate, hydroxypropyl acrylate, and hydroxybutyl acrylate. Most preferable are hydroxyethyl acrylate and hydroxypropyl acrylate.

A list of examples for the component B suitable for the dispersant f) or f-1) can be found in the before standing text in the description of e) polycarboxylate ethers (PCE), where suitable monomers bearing polyether side chains are given as examples.

Preferably the component B in the dispersant f) as well as the dispersant f-1) comprises an unsaturated carboxylic acid ester monomer or comprises a $C_{2-5}$ alkenyl ether monomer. More preferably B comprises a $C_2$ alkenyl ether monomer (vinyl ether monomer) or a $C_5$ alkenyl ether monomer, most preferably an isoprenol ether monomer.

Preferably the molar ratio of Component A to the component B in the dispersant f) or dispersant f-1) is from 10:1 to 1:2, more preferably 9:1 to 1:1, most preferably 5:1 to 2:1.

Preferably the component A in the dispersant f) or dispersant f-1) is selected from the group of alkyl monoesters, alkyl diesters, hydroxyalkyl monoesters, hydroxyalkyl diesters or mixtures thereof. Preferable are alkyl monoesters of acrylic acid and hydroxyalkyl monoesters of acrylic acid, more preferable are hydroxyalkyl monoesters of acrylic acid and most preferable are hydroxypropyl acrylate and/or hydroxyethyl acrylate.

The non-ionic dispersants f) and also the dispersants f-1) are able to retain the workability of cementitious compositions over a long period of time. The non-ionic copolymers f) or f-1) are initially non-dispersing molecules, having low or no affinity to cement particles, and therefore do not contribute to achieving the cementitious composition's initial workability targets. The dispersants f) and also f-1) initially remain in solution and are not adsorbed to the cement grains. The remaining polymers can act as a reservoir of dispersant for improving the slump-retention properties over time. Over time, as dispersant demand increases, due either in part to the exhaustion of conventional dispersant as discussed above, or partly or wholly to mix design factors, these molecules undergo base-promoted hydrolysis reactions along the polymer backbone which generate active binding sites both to initialize and to increase the polymer's binding affinity, resulting in the in-situ generation of "active" dispersant polymer over time, to extend slump and workability of the composition. In particular by hydrolysis of the component A (residue of a carboxylic acid ester monomer comprising a moiety hydrolysable in the cementitious mixture) when introducing the dispersant f) or f-1) into the strongly alkaline environment of cementitious compositions the initially not active dispersant is activated, resulting in good slump-retaining properties over a period of up to 90 minutes. WO 2009/153202 describes such dispersants f), also their way of production is described.

The dispersants of the polycondensate type according to this invention have the drawback that the slump-retention is improvable. After a period of time of about 45 minutes after mixing the polycondensates of this invention into a cementitious composition the slump begins to deteriorate. Formulation of the polycondensates according to this invention and dispersants f) or also f-1) allow to improve the slump-retention of the formulated admixtures significantly.

When the polycondensates according to this invention are present in a formulation together with the dispersants f), it is preferable that the weight ratio, in terms of solid content, of the polycondensates according to this invention to the dispersant f) is preferably higher than 1/5, more preferably higher than 1/3, most preferably higher than 2/3. The same ratios apply also for the dispersant f-1).

Preferably the non-ionic copolymer (dispersant f) may have a weight average molecular weight (g/mol) of about 5,000 to about 150,000, in some embodiments about 25,000 to about 50,000, which is determined under the following GPC conditions:

Column combination: OH-Pak SB-G, OH-Pak SB 804 HQ and OH-Pak SB 802.5 HQ by Shodex, Japan; eluent: 80 Vol.-% aqueous solution of $HCO_2NH_4$ (0.05 mol/l) and 20 Vol.-% acetonitrile; injection volume 100 μl; flow rate 0.5 ml/min. The molecular weight calibration was performed with poly(styrene sulfonate) standards for the UV detector and poly(ethylene oxide) standards for the RI detector. Both standards were purchased from PSS Polymer Standards Service, Germany. In order to determine the molecular weight of the polymers, the UV-detection at 254 nm wavelength was used, because the UV detector is only responsive towards the aromatic compounds and neglects inorganic impurities, that otherwise could falsify the results for the molecular weights.

Preferable as dispersants f) are i) non-ionic copolymers containing hydroxyethyl acrylate (as the monomer A) and ethoxylated isoprenol (as the monomer B) with a molecular weight in the range of 500 g/mol to 4.000 g/mol), preferably 800 g/mol to 1.500 g/mol or ii) non-ionic copolymers containing hydroxyethyl acrylate (as the monomer A) and ethoxylated hydroxybutyl vinyl ether (as the monomer B) with a molecular weight in the range of 500 g/mol to 4.000 g/mol, preferably 800 g/mol to 1.500 g/mol. The molar ratio of the monomers A to B in the case i) and ii) is 2/1 to 6/1, preferably 3/1 to 5/1. The molecular weight is from 5.000 to 50.000 g/mol, preferably 25.000 g/mol to 50.000 g/mol for the cases i) and ii). The conditions for the GPC measurement are the same as mentioned in the before standing text. The non-ionic copolymers f) or f-1) can be added to the cementitious mixture with the initial batch water or as a delayed addition, in a dosage range of 0.01 to 3 percent copolymer based on the weight of cementitious materials, and preferably 0.02 to 1 weight percent copolymer based on the weight of cementitious materials.

It should be noted that the polycondensates according to this invention when used in a formulation with the dispersant f) provide for the initial workability, including reduced viscosity of the cementitious composition (from about 0 minutes to about 30 to 45 minutes) in the sense of a water-reducer, whereas the dispersant f) is not so much active as a water reducer during the period from 0 to about 30 minutes, but works as a slump-retainer mainly during the period from about 30 minutes to about 90 minutes.

It can be said that the polycondensates according to this invention and the dispersant f) in a formulation complement each other in the sense that cementitious compositions with a good workability (good slump and good slump-retention) can be obtained in the time period from 0 to about 90 minutes and the plastic viscosity is low over a period of time from 0 to about 30 minutes. The slump-retainer dispersant f) provides sufficient slump-retention up to 90 minutes, but the plastic viscosity increases when time elapses (after about 30 minutes).

The g) phosphonate containing dispersants, which can be used as dispersant together with the polycondensates according to this invention in a formulation comprise from one to three phosphonate groups (preferably 2) and are described in WO 94/08913 A1. The disclosure of the phosphonate dispersant chemistry in WO 94/08913 A1 is hereby incorporated by reference. An example is the following dispersant with two phosphonate groups:

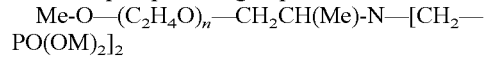

M is H, an alkali metal, (organic) ammonium ion or a ½ earth alkali metal, n is an integer from 5 to 70, preferably an integer from 10 to 50.

It is also possible that further dispersants according to the disclosure of WO 2011/104347 are contained in a formulation with the polycondensates according to this invention. These dispersants show a polyalkylene backbone with an anchor group for cementitious particles on one side. The anchor group can be for example selected from sugars, various anionic groups and/or silanes.

The further dispersant in the formulation with the polycondensates according to this invention can be a dispersant, which fulfils all the features of the polycondensate according to this invention, except that the number of ethylene glycol units in the side chain is higher than 41 with the proviso that the content of ethylene glycol units is higher than 80 mol % with respect to all alkylene glycol units in the polyether side chain.

The further dispersant in the formulation with the polycondensates according to this invention can also be a dispersant, which fulfils all the features of the polycondensate according to this invention, except that the polymerisation degree is outside the range from 10 to 75.

Also it is possible that both the before mentioned side chain length as well as the polycondensation degree of the further dispersant in the formulation are different from the polycondensates according to this invention.

Preferable are polycondensates in which the further dispersant in the formulation is f-1) a non ionic copolymer with a weight average molecular weight $M_w$ from 5.000 g/mol to less than 25.000 g/mol for extending workability to a cementitious mixture containing hydraulic cement and water, wherein the copolymer comprises residues of at least the following monomers:

Component A comprising an ethylenically unsaturated carboxylic acid ester monomer comprising a moiety hydrolysable in the cementitious mixture, wherein the hydrolysed monomer residue comprises an active binding site for a component of the cementitious mixture; and Component B comprising an ethylenically unsaturated, carboxylic acid ester or alkenyl ether monomer comprising at least one $C_{2-4}$ oxyalkylene side group of 10 to 70 units, preferably 10 to 30 units. Preferable is that at least 80 weight % of the $C_{2-4}$ oxyalkylene groups are $C_2$ oxyalkylene groups (ethylene groups).

Preferable as dispersants f-1) are i) non-ionic copolymers containing hydroxyethyl acrylate (as the monomer A) and ethoxylated isoprenol (as the monomer B) with a molecular weight in the range of 500 g/mol to 2.000 g/mol), preferably 500 g/mol to 1.500 g/mol or ii) non-ionic copolymers containing hydroxyethyl acrylate (as the monomer A) and ethoxylated hydroxybutyl vinyl ether (as the monomer B) with a molecular weight in the range of 500 g/mol to 2.000 g/mol, preferably 500 g/mol to 1.500 g/mol. The molar ratio of the monomers A to B in the case i) and ii) is 2/1 to 6/1, preferably 3/1 to 5/1. The molecular weight is from 5.000 to less than 25.000 g/mol, preferably 10.000 g/mol to 20.000 g/mol for the cases i) and ii). The conditions for the GPC measurement are the same as mentioned in the before standing text.

The non-ionic copolymers f) or f-1) can be added to the cementitious mixture with the initial batch water or as a delayed addition, in a dosage range of 0.01 to 3 percent copolymer based on the weight of cementitious materials, and preferably 0.02 to 1 weight percent copolymer based on the weight of cementitious materials.

The dispersants f-1) are similar in their chemical structure to the dispersants f), but are characterized by a relatively low weight average molecular weight $M_w$ from 5.000 g/mol to less than 25.000 g/mol and relatively short polyether side chains with the range of 10 to 70, preferably 10 to 30, units of $C_{2-4}$ oxyalkylene side groups.

Due to the relatively low weight average molecular weight $M_w$ and the relatively short side chain length it was surprisingly possible not only to provide an admixture, which is capable of keeping the level of workability of cementitious compositions like concrete at a high level (good slump-retention) over an extended period from about 30 minutes to about 90 minutes after mixing (this performance was already found for the dispersants f), but it was also possible to keep the rheology of the concrete in a good state over time, in particular it was possible to enable a reduction in the viscosities of cementitious compositions, especially of concrete and at the same time achievement of very good early strengths. The improvement of the rheological properties can be obtained when using the dispersants f-1) alone (in particular for the time period from 30 to 90 minutes) or also in a combination with the polycondensates according to this invention (in particular for the time period from 0 to about 90 minutes).

When the polycondensates according to this invention are present in a formulation together with the dispersants f-1), it is preferable that the weight ratio, in terms of solid content, of the polycondensates according to this invention to the dispersant f-1) is preferably higher than 1/4, more preferably higher than 1/3, most preferably higher than 2/3.

It should be noted that the polycondensates according to this invention when used in a formulation with the dispersant f-1) provide for the initial workability, including reduced viscosity of the cementitious composition (from about 0 minutes to about 30 minutes) in the sense of a water-reducer, whereas the dispersant f-1) is not so much active as a dispersant during the period from 0 to about 30 minutes, but works as a slump-retainer mainly during the period from about 30 minutes to about 90 minutes. The dispersant f-1) allows also the production of cementitious compositions with a low plastic viscosity, especially it develops its dispersing properties at a later point of time after mixing the composition. It can be said that the polycondensates according to this invention and the dispersant f-1) in a formulation complement each other in the sense that cementitious compositions with a good workability (good slump and good slump-retention) and low plastic viscosity over a long period of time from 0 to 90 minutes can be obtained. The single formulation components could only do this for the initial period of time (polycondensate according to this invention) or the later period of time (dispersant f-1)).

The invention concerns also building material mixtures comprising one or more polycondensates according to this invention and one or more inorganic binders selected from the group of α-calcium sulfate hemihydrate, β-calcium sulfate hemihydrate, calcium sulfate in the form of anhydrite, slag sand, fly ash, fumed silica, blast furnace slag, natural pozzolanes, burnt oil shale and/or (Portland) cement, preference being given to the presence of (Portland) cement with a proportion greater than 40% by weight based on the total amount of the inorganic binder.

The dosage of the polycondensates according to this invention is preferably in the range of 0.05 weight % to 1 weight %, with respect to the total amount of the inorganic binders. The dosage of the polycondensates according to this invention in concrete is more preferably in the range of 0.15 weight % to 0.5 weight %, with respect to the total amount of the inorganic binders. The building material mixtures can be for example concrete, mortar or grouts.

Preferable is a building material mixture, the building material mixture being preferably concrete, more preferably a self-compacting concrete (SCC), comprising aggregates and (Portland) cement and optionally further binders selected from the group of slag sand, fly ash, fumed silica, blast furnace slag, natural pozzolanes or burnt oil shale, whereby any combination of the before standing binders is possible.

Preferably the content of the fines (fine particles) in the building material mixture has a lower limit of 200 kg/m$^3$, more preferably 300 kg/m$^3$ and most preferably 350 kg/m$^3$; the upper limit of the content of the fines is preferably 1.200 kg/m$^3$, more preferably 650 kg/m$^3$ and most preferably 450 kg/m$^3$. The fines (fine particles) in this patent application are defined as all particles (preferably from the binders and from the fine fraction of the aggregates (sand)), which pass a sieve with an opening of 0.125 mm according to EN 933-1. The content of fines is usually made up from the sum of binder materials like (Portland) cement and optionally further binders selected from the group of slag sand, fly ash, fumed silica, blast furnace slag, natural pozzolanes or burnt oil shale on the one side and the content of fines from the fine fraction of the aggregates (sand). It is also possible that limestone powder is contained in the concrete, which would also qualify as fines. The particle size of the binders is typically fine enough in order to qualify as fines, the fraction of the sand has to be tested according to EN 933-1 in order to determine which part of the sand qualifies as fines.

Preferably the water to binder ratio (W/B) has a lower limit of 0.3, more preferably 0.35, most preferably 0.4, the upper limit is preferably 0.6, more preferably 0.55 and most preferably 0.50. In this case binder means the sum of all binders used, if only (Portland) cement is used the W/B ratio is typically called water/cement ratio (W/C). The preferred W/C ratios are analogous to the before mentioned preferred W/B ratios, which means that the same preferable values apply.

The slump flow according to EN12350-8 of the building materials, preferably concrete, more preferably self-compacting concrete (SCC) has preferably a lower limit of 55 cm, more preferably 60 cm and most preferably 65 cm, whereas the upper limit is preferably 80 cm, more preferably 75 cm.

The aggregate in this invention can be for example silica, quartz, sand, crushed marble, glass spheres, granite, limestone, sandstone, calcite, marble, serpentine, travertine, dolomite, feldspar, gneiss, alluvial sands, any other durable aggregate, and mixtures thereof. The aggregates are often also called fillers and in particular do not work as a binder.

It has been found that it is possible to obtain concretes with a low plastic viscosity and good segregation resistance (e.g. bleeding) when using the polycondensates according to this invention in concrete, as can be seen also from the experimental part of this application (concrete examples in mix designs A (table 3), B (table 4), C (table 5), D (table 6) and E (table 7). The relatively short V-funnel time results for the mix designs A and B indicate a low viscosity of the concretes, in the mix designs C, D and E this finding is reconfirmed by direct measurements of the plastic viscosity via rheometer measurements. The comparison examples are e.g. polycondensates similar to the polycondensates according to this invention, but with a longer polyether side chain length and/or a value of the polycondensation degree outside the claimed range. Also conventional dispersants of the PCE type were used as comparison examples. The comparison examples showed higher plastic viscosities of the concrete. Details can be found in the experimental part of this patent application.

In particular preferable are self-compacting concretes comprising aggregates and (Portland) cement and optionally further binders selected from the group of slag sand, fly ash, fumed silica, blast furnace slag, natural pozzolanes or burnt oil shale, whereby any combination of the before standing binders is possible and wherein the content of the fines (fine particles) in the building material mixture has a lower limit of 300 kg/m$^3$, preferably 350 kg/m$^3$ and the upper limit of the content of the fines is 700 kg/m$^3$, preferably 650 kg/m$^3$, more preferably 450 kg/m$^3$. Most preferable is the low range of fines from 350 kg/m$^3$ to 450 kg/m$^3$. The fines (fine particles) are defined as all particles (preferably from the binders and from the fine fraction of the aggregates (sand)), which pass a sieve with an opening of 0.125 mm according to EN 933-1. Preferably the self-compacting concretes do not contain any viscosity modifying admixture (VMA), which has the function of increasing the viscosity of the concrete in order to stabilize it against segregation (bleeding). The viscosity modifying admixture (VMA) is preferably a high molecular organic (co)polymer made from sulfonated monomers like for example 2-acrylamido-2-methylpropane sulfonic acid (AMPS) and acrylamide derivatives. Viscosity modifying admixtures and their application for the stabilization of cementitious compositions against segregation are for example described in the documents US2007/0083020 A1, US 2009/0036571 A 1 and US 2008/0200590 A1.

Preferably the water to binder ratio (W/B) of the self-compacting concretes has a lower limit of 0.3, more preferably 0.35, most preferably 0.4, the upper limit is preferably 0.6, more preferably 0.55 and most preferably 0.50. In this case binder means the sum of all binders used, if only (Portland) cement is used the W/B ratio is typically called water/cement ratio (W/C). The preferred W/C ratios are analogous to the before mentioned preferred W/B ratios, which means that the same preferable values apply.

The slump flow according to EN12350-8 of the self-compacting concretes (SCC) has preferably a lower limit of 60 cm, whereas the upper limit is preferably 80 cm, more preferably 75 cm.

The prior art distinguishes in principal three types of self-compacting concretes (SCC), the i) powder type with high contents of fines (powder) in the range from usually about 550 to 650 kg/m$^3$, the ii) viscosity type with a low contents of fines (powder) in the range from usually about 350 to 450 kg/m$^3$ and the iii) combination type with a medium contents of fines (powder) in the range from usually about 450 to 550 kg/m$^3$. Typically the type i) does not contain a viscosity modifying admixture (VMA), whereas the type ii) needs such an admixture for obtaining a sufficient level of segregation resistance. The combination type needs also usually a viscosity modifying admixture (VMA), but to a lesser extent due to the presence of a higher proportion of fines in the mix design, which means that the dosage of the VMA will be usually lower compared to the viscosity type ii).

Due to the presence of a high contents of fines in the type i) no addition of a viscosity modifying admixture (VMA) is necessary as the high powder content is sufficient to prevent segregation (bleeding). Disadvantage is a relatively sticky consistency and the cost for the high amount of binders in the mix design.

The viscosity type ii) needs the addition of a VMA, which has of course the disadvantage that the viscosity of the concrete is increased and becomes quite sticky. The combination type ii) is as the name "combination type" indicates in its properties in between the types i) and ii)). Disadvantage is a still relatively high plastic viscosity of the concretes.

Due to the use of the polycondensates according to this invention it was very surprisingly possible to provide self-compacting concretes (SCCs) with a slump flow of up to 70 cm, a relatively low contents of fines, preferably in the range of 350 kg/m$^3$ to 450 kg/m$^3$, and at the same time a low plastic viscosity. The person skilled in the art would expect that such a concrete with high slump flow, low fines and a low plastic viscosity would heavily segregate (bleed) and would not be feasible for said reasons. The advantage of the polycondensates according to this invention is therefore that it allows access to good quality and segregation resistant self-compacting concretes with high flowability and at the same time a low plastic viscosity without segregation problems. It is deemed that self-compacting concretes with the before mentioned advantageous properties have not been available in the prior art. Experimental prove and further details of the advantageous effects of the polycondensates according to this invention can be found in particular in the concrete tests of mix designs D (table 6) and E (table 7).

The invention concerns also the use of the polycondensates according to this invention for the dispersion of inorganic binders, selected from the group of α-calcium sulfate hemihydrate, β-calcium sulfate hemihydrate, calcium sulfate in the form of anhydrite, slag sand, fly ash, fumed silica, blast furnace slag, natural pozzolanes, (Portland) cement and/or burnt oil shale, preference being given to the presence of (Portland) cement with a proportion greater than 40% by weight based on the total amount of the inorganic binder. The invention concerns more preferably the use of the polycondensates according to this invention for the dispersion of concrete.

The invention concerns also the use of the polycondensates according to this invention for the reduction of the plastic viscosity of concrete.

Concrete may contain besides water, aggregates and (Portland) cement also other inorganic binders, preferably selected from the group of slag sand, fly ash, fumed silica, blast furnace slag, natural pozzolanes and/or burnt oil shale. Preferably the concrete contains (Portland) cement with a proportion of greater than 40% by weight based on the total amount of the before mentioned inorganic binders (other inorganic binders and (Portland) cement). More preferably the use of the polycondensates according to this invention for the reduction of the plastic viscosity of concrete is characterized in that the plastic viscosity of a concrete made with a polycondensate according to this invention is 10-40% lower compared to a reference concrete made with the polycarboxylate ether (PCE) type admixture P3 in the ICAR viscosity experiment, with the proviso that the concrete mix designs and the workability expressed by the slump test according to DIN EN 12350 (same slump) for the concrete made with the polycondensate according to this invention and the reference concrete made with the PCE type admixture P3 are identical. The PCE type admixture P3 is a copolymer obtained by radical polymerization and exhibits a molar ratio of 1 mol poly(ethylene glycol) mono methyl ether methacrylate ($M_w$=950 g/mol) to 2.7 mol methacrylic acid. The molecular weight of P3 is 26,750 g/mol, measured under the GPC conditions as mentioned in the before standing text.

An identical concrete mix design means in particular that the water content, aggregate content, the kind and amounts of binder(s) and all other ingredients are identical, only the dosage of the polycondensate according to this invention and the dosage of the polycarboxylate ether (PCE) type admixture P3 can be different or can be the same. Said dosages refer to the sum of all binders and depend on the mix design and the requirements of the specific building project. It is possible and in general will be the case that for achieving the same workability (slump) the dosage of the polycondensate according to this invention and the reference admixture will be different. The dosages can also be the same depending on the concrete mix design selected. The dosage of concrete admixtures is generally not considered part of the concrete mix design by the person skilled in the art, as the dosage is very low.

The invention concerns also the use of polycondensates according to this invention for self-compacting concrete, preferably for the reduction of the plastic viscosity of the self-compacting concrete, with a contents of fines between 300 kg/m$^3$ to 700 kg/m$^3$, preferably 350 kg/m$^3$ to 650 kg/m$^3$, more preferably 350 kg/m$^3$ to 450 kg/m$^3$, the definition of fines is all particles, which pass a sieve with an opening of 0.125 mm according to EN 933-1, the self-compacting concrete comprising, water, aggregates and (Portland) cement and optionally further binders selected from the group of slag sand, fly ash, fumed silica, blast furnace slag, natural pozzolanes or burnt oil shale, whereby any combination of the before standing binders is possible.

In particular preferable are self-compacting concretes comprising aggregates and (Portland) cement and optionally further binders selected from the group of slag sand, fly ash, fumed silica, blast furnace slag, natural pozzolanes or burnt oil shale, whereby any combination of the before standing binders is possible and wherein the content of the fines (fine particles) in the building material mixture has a lower limit of 300 kg/m$^3$, preferably 350 kg/m$^3$ and the upper limit of the content of the fines is 700 kg/m$^3$, preferably 650 kg/m$^3$, more preferably 450 kg/m$^3$. The fines (fine particles) are defined as all particles (preferably from the binders and from the fine fraction of the aggregates (sand)), which pass a sieve with an opening of 0.125 mm according to EN 933-1. Preferably the self-compacting concretes do not contain any viscosity modifying admixture (VMA), which has the function of increasing the viscosity of the concrete in order to stabilize it against segregation (bleeding).

Preferably the water to binder ratio (W/B) of the self-compacting concretes has a lower limit of 0.3, more preferably 0.35, most preferably 0.4, the upper limit is preferably 0.6, more preferably 0.55 and most preferably 0.50. In this case binder means the sum of all binders used, if only (Portland) cement is used the W/B ratio is typically called water/cement ratio (W/C). The preferred W/C ratios are analogous to the before mentioned preferred W/B ratios, which means that the same preferable values apply.

The slump flow according to EN12350-8 of the self-compacting concretes (SCC) has preferably a lower limit of 60 cm, whereas the upper limit is preferably 80 cm, more preferably 75 cm.

The advantages of the use of the polycondensates according to this invention when used in self compacting concrete were described in detail in the before standing text and proved in the experimental part, in particular the results for the mix designs D (table 6) and E (table 7).

EXAMPLES

The polycondensates of this invention were produced according to the following general phosphorylation and polycondensation procedure:

A reactor, equipped with heating and stirrer is charged with 127 g of polyphosphoric acid (specified to have 85% $P_2O_5$ content). The content is heated to 60-100° C. 1 mol of an alcohol is added to the stirred reaction mixture through a period of 1 to 3 hours. After the addition is finished, the reaction mix is stirred for an additional hour.

In the case that phenoxyethanol has been used as an alcohol, the obtained reaction product contained 75%-wt. of phenoxyethanol phosphoric acid monoester (ester of 1 mol of phenoxyethanol with 1 mol of phosphoric acid), 5%-wt. of Bis(phenoxyethanol)phosphoric acid ester (ester of 2 mol phenoxyethanol with 1 mol of phosphoric acid), 1%-wt. of unreacted phenoxyethanol and 19%-wt. of unreacted phosphoric acid. Thus, the reaction product contains in total 81%-wt. of the before mentioned three types of aromatic monomers. The reaction product of the phosphorylation can be used without further purification as starting material for the following polycondensation step.

General Polycondensation Procedure:

A pressure proof and corrosion resistant reactor (glass-lined steel, tantalized steel or hastelloy reactor), equipped with a stirrer and temperature control is charged with the below listed starting materials in the given order (the type of alcohol of 1.) and the phosphorylated product of 2.) can be varied):

1. Poly(ethylenoxide)monophenylether (Ph-PEG), 2. Phosphorylated phenoxyethanol (PPE), 3. Formalin solution (37%, reaction type A) or paraformaldehyde plus water (reaction type B), 4. Sulfuric acid 96% or methansulfonic acid 70%.

Upon completion of the addition of the acid, the reaction mix is heated to 100-120° C. After 2 to 5 hours the polycondensation reaction is finished, water is added and the polycondensate is neutralized with NaOH to pH 6-8. Finally the solid content of the product is adjusted with water to 25-35%.

The molecular weights of the polymers were determined by using gel permeation chromatography method (GPC) as described below.

Column combination: OH-Pak SB-G, OH-Pak SB 804 HQ and OH-Pak SB 802.5 HQ by Shodex, Japan; eluent: 80 Vol.-% aqueous solution of $HCO_2NH_4$ (0.05 mol/l) and 20 Vol.-% acetonitrile; injection volume 100 µl; flow rate 0.5 ml/min. The molecular weight calibration was performed with poly(styrene sulfonate) standards for the UV detector and poly(ethylene oxide) standards for the RI detector. Both standards were purchased from PSS Polymer Standards Service, Germany. In order to determine the molecular weight of the polymers, result based on UV-detection (254 nm) was used, because the UV detector is only responsive towards the aromatic compounds and neglects inorganic impurities, that otherwise could falsify the results for the molecular weights.

The exact amounts of the starting materials are given in table 1, the reaction conditions and results are summarized in table 2. It is also possible to do the phosphorylation reaction of an aromatic alcohol like for example phenoxyethanol with a phosphorylation agent during the polycondensation reaction.

into forms (kneadability, placeability, spreadability, sprayability, pumpability or flowability). Furthermore, the flow properties of concrete are influenced by thixotropy, a shear thinning effect. Under static conditions the concrete remains thick (viscous) but it will become more flowable (thinner, less viscous) over time when shaken, agitated or otherwise stressed. Upon stopping the mechanical stress it takes a certain time for the system to return in its initial viscous state.

TABLE 1

Details of the polycondensation reaction

| Ex. No. | Ph-PEG MW [D] | Ph-PEG [g] | Ph-PEG [mol] | Reaction product of phosphorylation of phenoxyethanol by polyphosphoric acid [1] [g] | Formaline 37% [g] | Paraformaldehyde [g] | Paraformaldehyde water [g] | $H_2SO_4$ 96% [g] | Methansulfonic acid 70% [g] |
|---|---|---|---|---|---|---|---|---|---|
| 1 | 750 | 598 | 0.8 | 104.6 | 0 | 40.46 | 9.66 | 24 | 0 |
| 2 | 750 | 602 | 0.8 | 105.1 | 103.9 | 0 | 0 | 24 | 0 |
| 3 | 750 | 601 | 0.8 | 209.3 | 0 | 58.16 | 12 | 0 | 110 |
| 4 | 750 | 603 | 0.8 | 208.7 | 149.3 | 0 | 0 | 0 | 112 |
| 5 | 1500 | 600 | 0.4 | 174.5 | 0 | 37.9 | 0 | 0 | 109.7 |
| 6 | 1500 | 599 | 0.4 | 175.2 | 0 | 38.1 | 0 | 0 | 109.5 |
| 7* | 5000 | 597 | 0.12 | 104.7 | 0 | 21.92 | 34.6 | 24.5 | 0 |
| 8* | 750 | 600 | 0.8 | 207.5 | 0 | 69 | 0 | 25 | 0 |
| 9 | 1500 | 601 | 0.4 | 130.5 | 81.2 | 0 | 0 | 41 | 0 |
| 10* | 2000 | 600 | 0.3 | 62.2 | 60.9 | 0 | 0 | 30.7 | 0 |
| 11 | 750 | 561 | 0.75 | 99.2 | 0 | 40.7 | 9 | 22.5 | 0 |

(*= comparative examples)
[1] contains 75%-wt. of phenoxyethanol phosphoric acid monoester, 5%-wt. of bis(phenoxyethanol)phosphoric acid ester, 1%-wt. of phenoxyethanol and 19%-wt. of phosphoric acid.

TABLE 2

Reaction conditions and PD of the polycondensates

| Example (sample) No. | Reaction temperature [° C.] | Maximum pressure [bar] | Reaction time [min] | $M_w$ of the polycondensate $M_W$ [g/mol] | Polycondensation degree (PD) |
|---|---|---|---|---|---|
| 1 | 120 | 0.8 | 240 | 13170 | 44.6 |
| 2 | 130 | 0.8 | 150 | 7110 | 24.1 |
| 3 | 120 | 0.8 | 240 | 14130 | 56.4 |
| 4 | 130 | 0.9 | 240 | 8350 | 33.3 |
| 5 | 110 | 0 | 300 | 20120 | 55.7 |
| 6 | 110 | 0 | 180 | 15230 | 42.1 |
| 7* | 120 | 0.9 | 240 | 25730 | 37.4 |
| 8* | 130 | 0.8 | 300 | 24380 | 102.4 |
| 9 | 110 | 0 | 240 | 10550 | 28.4 |
| 10* | 110 | 0 | 240 | 11960 | 20.9 |
| 11 | 120 | 0.8 | 240 | 13170 | 46.8 |

(*= comparative examples)
Besides the three comparative polycondensate examples 7* (the polyether side chain is too long), 8* (the PD value is too high) and 10* (the polyether side chain is too long) as described in tables 1 and 2, three conventional, polycarboxylate ether based admixtures P1, P2 and P3 were also used as reference admixtures. These comb polymers (PCE) feature poly(meth)acrylic acid polymer backbones and polyethylene glycol side chains attached to the polymer backbone.
P1 exhibits a molar ratio of 0.6 mol poly(ethylene glycol) mono methyl ether methacrylate ($M_W$ 950 g/mol) to 1.4 mol methacrylic acid. The molecular weight of P1 is 25,800 g/mol. P2 exhibits a molar ratio of 1 mol ethoxylated monohydroxybutylvinyl ether ($M_W$ 3,000 g/mol) to 3.3 mol acrylic acid. The molecular weight of P1 is 24,630 g/mol.
P3 exhibits a molar ratio of 1 mol poly(ethylene glycol) mono methyl ether methacrylate ($M_W$ 950 g/mol) to 2.7 mol methacrylic acid. The molecular weight of P3 is 26,750 g/mol.

Application Tests

Since concrete is a granular system, its rheology can be described by the Bingham model. Thus, the yield stress determines the value when concrete begins to flow under its own mass. This value can be easily measured by the flow test. The flow of concrete or mortar correlates with the yield stress ($\tau_0$). The plastic viscosity ($\mu$) determines the flow time or speed of concrete during molding or pumping. This value indicates how easily the concrete can be placed or be filled into forms (kneadability, placeability, spreadability, sprayability, pumpability or flowability). Furthermore, the flow The thixotropy of concrete can be utilized to improve its short term flowability. There are different possibilities to determine the rheological behavior of concrete: the V-Funnel time test, and the viscometer test or the tribometer test. The V-Funnel test is the easiest way to evaluate the influence of superplasticizers on the flowability of concrete. According to D. Feys, K. H. Kayat; Comparison and limitation of different concrete rheometers; Proceedings of the 7th International RILEM conference on self-compacting concrete and 1ˢᵗ international conference of rheology and processing of construction materials; Paris, France, 2013, a tribometer is a powerful tool to simulate a pressure loss in a concrete pump.

Examples

In order to evaluate the behavior of concrete in the V-Funnel test, three different concrete mix designs (mix design A, B and C), leading to concrete with a very sticky consistency, were used.

Mix Design A:

994 kg/m³ crushed aggregate, 635 kg/m³ sand, 300 kg/m³ CEM I 42.5 R, 75 kg/m³ fly ash, 120 kg/m³ blast furnace slag (4000 blaine), 40 kg/m³ limestone powder Water/Binder: 0.38

The spread of the concrete (after 15 shocks) was adjusted with the respective superplasticizer (according to DIN EN 12350) to obtain values of 61±5 cm.

The V-Funnel test results according to EN 12350-9 are summarized in table 3. All superplasticizers are 30% aqueous solutions, the superplasticizers being formulated with 1 weight % of a silicon-based defoamer in order to reduce the air entrainment into the concrete to less than 3 volume %. The dosages of the superplasticizers in the examples 1 to 8 and example P1 are given as solid content by weight of binder content of the concrete mix (% by weight of binder (% b.w.o.b.)).

TABLE 3

V-funnel concrete tests for concrete mix A

| Example No. | Dosage [% b.w.o.b.] | Spread [cm] | | | | V-funnel time [sec] | | | |
|---|---|---|---|---|---|---|---|---|---|
| | | 5 min | 15 min | 30 min | 60 min | 5 min | 15 min | 30 min | 60 min |
| 1 | 0.95 | 66.0 | 67.5 | 67.0 | 67.0 | 21.8 | 23.6 | 24.5 | 36.4 |
| 2 | 0.95 | 66.0 | 67.0 | 68.0 | 67.5 | 21.9 | 20.5 | 24.4 | 30.2 |
| 3 | 0.90 | 59.5 | 69.0 | 66.5 | 59.0 | 22.9 | 22.5 | 34.4 | 40.4 |
| 4 | 0.90 | 60.0 | 72.5 | 65.0 | 58.0 | 22.5 | 20.7 | 27.3 | 42.8 |
| 5 | 0.72 | 56.0 | 63.0 | 64.5 | 62.0 | 24.9 | 24.70 | 40.8 | n.m.** |
| 6 | 0.72 | 56.0 | 63.5 | 64.0 | 60.0 | 24.9 | 24.4 | 38.2 | 40.5 |
| 7* | 0.62 | 59.5 | 72.5 | 67.0 | 59.0 | 25.6 | 30.3 | 60.1 | n.m.** |
| 8* | 0.90 | 61.0 | 70.5 | 64.0 | 58.0 | 29.7 | 42.3 | 73.6 | n.m.** |
| P1* | 0.56 | 66.0 | 68.0 | 67.0 | 65.0 | 32.0 | 46.75 | 70.3 | n.m.** |

(*= comparative examples)
(**n.m. = not measurable, the flow stopped)

Mix Design B:

997 kg/m³ crushed aggregate, 633 kg/m³ crushed sand, 300 kg/m³ CEM I 42.5 R, 75 kg/m³ fly ash, 120 kg/m³ blast furnace slag (4000 blaine), 40 kg/m³ limestone powder Water/Cement: 0.62

The spread of the concrete (after 15 shocks) was adjusted with the respective superplasticizer (according to DIN EN 12350) to obtain values of 66±2 cm.

The V-Funnel test results are summarized in table 4. All superplasticizers are 30% aqueous solutions, the superplasticizers being formulated with 1 weight % of a silicon-based defoamer in order to reduce the air entrainment into the concrete to less than 3 volume %. The dosages in the examples 9 to 11 of the superplasticizers are given as solid content by weight of binder content of the concrete mix (% by weight of cement (% b.w.o.c.)).

TABLE 4

V-funnel concrete tests for concrete mix B

| Example No. | Dosage [% b.w.o.c.] | Spread [cm] | | | | V-funnel time [sec] | | | |
|---|---|---|---|---|---|---|---|---|---|
| | | 5 min | 15 min | 30 min | 60 min | 10 min | 20 min | 35 min | 65 min |
| 9 | 0.70 | 68.0 | 66.5 | 68.0 | 68.0 | 16.6 | 16.8 | 22.0 | 34.9 |
| 10* | 1.00 | 66.0 | 63.0 | 64.5 | 64.0 | 31.3 | 31.4 | 39.1 | 67.3 |
| 11 | 0.80 | 64.0 | 65.0 | 66.0 | 63.5 | 26.3 | 24.0 | 25.8 | 39.7 |

(*= comparative examples)

In the test of mix design B three polymers, example no. 9 (Mw of side chain=1.500 g/mol), comparative example 10*(the side chain of 2.000 g/mol is outside of the claimed region) and 11 (Mw of side chain=750 g/mol) were investigated with respect to the V-funnel times. The comparative example 10* has a side chain length of about 44 ethylene glycol units, which is beyond the claimed region of 9 to 41 ethylene glycol units. Examples no. 9 and 11 are superior in the V-funnel test compared to the comparative example 10*, because the V-funnel times are shorter and therefore the viscosity of the concrete is lower. This result shows that the side chain length should not be too long in order to obtain the viscosity reduction effects. So the combination of a proper PD value and a proper side chain length is decisive.

In a further test series a very sticky concrete (mix design C) was tested in a tribometer, as well as a ICAR rheometer. The mix design B and the test results are summarized in table 5:

ICAR Rheometer test. Moreover it is remarkable to note that the plastic viscosity, which is correlated with the V-funnel time, is not related to the spread values, as can be seen, comparing the 5 min values of examples 5 and 6 with the comparative examples 7, 8 (two not inventive polycondensates) and P1 (a PCE) in table 3. The yield value was also reduced, but was still sufficiently high to prevent the concrete mix from segregation.

It can be concluded that the polycondensates according to this invention, having relatively short polyether side chains and relatively short polymer backbones bring about the benefit of reduced plastic viscosities when concrete is made with said polycondensates.

The polycondensates according to this invention were also tested in ready mix designs and precast mix designs, the mix designs being in each case that of a self-compacting concrete (SCC) with a relatively low content of fines. Such a low contents of fines needs conventionally (in the prior art)

TABLE 5

Concrete test results for concrete mix design C

| | Comparative Example 1 (Formulation of two PCEs, P1 and P2) | Comparative Example 2 (P3 (PCE)) | Inventive Example 1 (as described in table 1) |
|---|---|---|---|
| CEM I 52.5N PM [kg/m$^3$] | 190 | 190 | 190 |
| Fly ash [kg/m$^3$] | 75 | 75 | 75 |
| Blast furnace slag [kg/m$^3$] | 120 | 120 | 120 |
| Crushed limestone aggregates | Sand 0/4: 845 kg/m$^3$ Gravel 6/10: 995 kg/m$^3$ | Sand 0/4: 845 kg/m$^3$ Gravel 6/10: 995 kg/m$^3$ | Sand 0/4: 845 kg/m$^3$ Gravel 6/10: 995 kg/m3 |
| WATER [kg/m$^3$] | 145.0 | 145.0 | 145.0 |
| Water/Binder | 0.38 | 0.38 | 0.38 |
| Dosage Admixture | 0.6% P1 (20% solid content (s.c.)) + 1.4% P2 (23% s.c.) | 1.13% P3 (26% s.c.) | 1.25% (25% s.c.) |
| Flow test DIN table (no shock) | 32.5 cm | 32 cm | 29.5 cm |
| Flow test DIN DIN EN 12350 table (15 shocks) | 50 cm | 51 cm | 48 cm |
| TRIBOMETER Constant viscosity [Pa · s/m] | 1380 | 1100 | 942 |
| ICAR RHEOMETER Yield value [Pa] | 115.9 | 108 | 92.5 |
| ICAR RHEOMETER Plastic viscosity [Pa · s] | 92.5 | 85.2 | 61.2 |
| Compressive strength 21 h [N/mm$^2$] | 8 | 12 | 6 |
| Compressive strength 28 days [N/mm$^2$] | 47 | 51 | 46 |

It becomes clear that the concrete prepared with the polycondensate according to the inventive example 1 shows a significantly reduced viscosity in the tribometer test, despite exhibiting a slightly reduced DIN test flow compared to the comparative examples. This property can be correlated with an improved pumpability of the concrete. The result is also supported by measurements with the ICAR rheometer. The plastic viscosity determined for the concrete prepared with the inventive polycondensate according to the inventive example 1 is reduced by 34%, respectively 28% compared to the concrete mixes prepared with the comparative polycarboxylate (PCE) examples P1/P2 and P3 in the usually the addition of a viscosity modifying admixture (VMA), which increases the viscosity of the concrete in order to avoid segregation and bleeding (viscosity type of self-compacting concrete). However with the polycondensates according to this invention the use of VMAs could be avoided, resulting in concretes with a relatively low plastic viscosity. Typically the content of fines in the viscosity type of self-compacting concrete is from about 300 to 650 kg/m$^3$, preferably 350 to 450 kg/m$^3$.

The details of the mix design and the concrete test results for the ready mix tests are given in the following table 6 and for the precast mix design in the table 7:

TABLE 6

Concrete test results for the ready mix design (Mix design D)

|  | Comparative Example 1 (Only PCE, no VMA) | Comparative Example 2 (PCE and VMA) | Inventive Example 1 (as described in table 1) |
|---|---|---|---|
| CEM II/A-LL 42.5R Monselice [kg/m³] | 350 | 350 | 350 |
| Sand [kg/m³] | 1.135 | 1.135 | 1.135 |
| Gravel (maximum 20 mm) [kg/m³] | 755 | 755 | 755 |
| Total fines (from cement and sand) | 406 (350 + 56) | 406 (350 + 56) | 406 (350 + 56) |
| WATER [kg/m³] | 178.5 | 178.5 | 178.5 |
| Water/Cement | 0.51 | 0.51 | 0.51 |
| VMA Master Matrix SDC 150 (solid content in % by weight of cement) | — | 0.1 | — |
| P4* (solid content in % by weight of cement) | 0.28 | 0.28 | — |
| Inventive Example 1 (as described in table 1) (solid content in % by weight of cement) | — | — | 0.32 |
| Slump flow (EN 12350-8) [cm] | >70 | 63 | 62 |
| $t_{500}$ (sec) (EN 12350-8) | Not determined | 8.6 | 4.4 |
| Sieve segregation (%) (EN12350-11) | 15 | 1 | 1 |
| 4C RHEOMETER Plastic viscosity [Pa · s] | Not determined | 239 | 72 |
| Concrete appearance | Bleeding and segregation | Good | Good, the lowest stickiness (easy to move by a trowel) |
| Compressive strength 24 h [N/mm²] | Not determined because of bad consistency | 28 | 26 |
| Compressive strength 28 days [N/mm²] | Not determined because of bad consistency | 53 | 52 |

P4* is a comparative example (PCE) and is a copolymer of isoprenol PEG and acrylic acid (1:1.1).

VMA Master Matrix SDC 150 is an aqueous composition of a high molecular weight terpolymer made from the monomers 2-acrylamido 2-methylpropanesulfonic acid, acrylamide and ethoxylated hydroxybutyl vinylether. It is obtainable from BASF Performance Products GmbH, Krieglach, Austria.

TABLE 7

Concrete test results for the precast mix design (Mix design E)

|  | Comparative Example 1 (Only PCE, no VMA) | Comparative Example 2 (PCE and VMA) | Inventive Example 1 (as described in table 1) |
|---|---|---|---|
| CEM I 52.5R Monselice [kg/m³] | 400 | 400 | 400 |
| Sand [kg/m³] | 1.040 | 1.040 | 1.040 |
| Gravel (maximum 20 mm) [kg/m³] | 840 | 840 | 840 |
| Total fines (from cement and sand) | 452 (400 + 52) | 452 (400 + 52) | 452 (400 + 52) |
| WATER [kg/m³] | 180 | 180 | 180 |
| Water/Cement | 0.45 | 0.45 | 0.45 |
| VMA Master Matrix SDC 150 (solid content in % by weight of cement) | — | 0.2 | — |
| P5* (solid content in % by weight of cement) | 0.18 | 0.18 | — |
| Inventive Example 1 (as described in table 1) (solid content in % by weight of cement) | — | — | 0.54 |
| Slump flow (EN 12350-8) [cm] | >70 | 62 | 71 |

TABLE 7-continued

Concrete test results for the precast mix design (Mix design E)

|  | Comparative Example 1 (Only PCE, no VMA) | Comparative Example 2 (PCE and VMA) | Inventive Example 1 (as described in table 1) |
|---|---|---|---|
| $t_{500}$ (sec) (EN 12350-8) | Not determined | 4.4 | 2.5 |
| Sieve segregation (%) (EN12350-11) | 18 | 2 | 3 |
| 4C RHEOMETER Plastic viscosity [Pa · s] | Not determined | 151 | 70 |
| Concrete aspect | Bleeding and segregation | Good | Good, the lowest stickiness (easy to move by a trowel) |
| Compressive strength 24 h [N/mm²] | Not determined because of bad consistency | 50 | 47 |
| Compressive strength 28 days [N/mm²] | Not determined because of bad consistency | 64 | 64 |

P5* is a comparative example (PCE) and is a copolymer of ethoxylated hydroxybutyl vinylether and acrylic acid (1:3).

VMA Master Matrix SDC 150 is an aqueous composition of a high molecular weight terpolymer made from the monomers 2-acrylamido 2-methylpropanesulfonic acid, acrylamide and ethoxylated hydroxybutyl vinylether. It is obtainable from BASF Performance Products GmbH, Krieglach, Austria.

In each case for the ready mix (table 6) and the precast mix design (table 7) the concrete tests were done for the polycondensate according to this invention without addition of a viscosity modifying admixture, for a conventional PCE without viscosity modifying admixture (VMA) (comparative example 1) and for a combination of a conventional PCE and a VMA (comparative example 2).

Measured were the slump flow (cm), the time to reach a slump flow of 500 mm $t_{500}$ (seconds) in the slump flow experiment, the sieve segregation (%) and the plastic viscosity by measurement with a 4 C. Rheometer from the Danish Technological Institute.

In particular low $t_{500}$ (in seconds) values are an evidence of a low viscosity of the cementitious material, which is capable of flowing very quickly due to the low viscosity. A high value of sieve segregation (%) points towards strong bleeding, respectively segregation of the concrete. In the sieve segregation test concrete is poured into a mesh under defined conditions (EN 12350-11) and the percentage of material passing the mesh is determined.

From both series of tests in table 6 and 7 can be seen that the polycondensate according to this invention allows to obtain a highly fluid concrete with a slump flow of 62 cm and up to 70 cm, which does not segregate (sieve segregation as low as 1%, respectively 3% and good aspect). The viscosity as can be seen from the $t_{500}$ results of 4.4 and 2.5 seconds is very low and is reconfirmed by the plastic viscosity measurement with the 4C Rheometer, giving values as low as about 70 Pa*s.

On the other side comparative example 1 (in both tables 6 and 7) gave a strongly bleeding concrete. This result was to be expected due to the fact that the content of fines was rather low and no viscosity modifying admixture was used. The sieve segregation results were quite bad (as high as 15 and 18%). Due to the bad consistency of the concrete it was not possible to measure the plastic viscosity and the $t_{500}$ value.

For comparative example 2 (in both tables 6 and 7) it was possible to eliminate the segregation of the concrete by the viscosity modifying admixture (VMA). However as could be expected from the addition of the VMA, the concrete became quite sticky. In each case the $t_{500}$ values are higher (8.6 s vs. 4.4 s in table 6; and 4.4 vs. 2.5 s in table 7). Also the plastic viscosities are with values of 239 and 151 Pa*s distinctly higher than the range of about 70 Pa*s for the examples according to this invention.

In order to improve the workability of mortar or concrete over time and keeping the plastic viscosity low, several plasticizer formulations containing a polycondensate according to this invention (inventive example 1 of table 1) were formulated together with further dispersants of the type f-1), which is a non-ionic copolymer for extending workability to a cementitious composition and with further dispersants of the type e) polycarboxylate ether (PCE 1, PCE 2 and PCE 3 of the following table 8). The test under number 5 is a sample of 100% of the polycondensate according to this invention (inventive example 1 of table 1).

TABLE 8

Formulation details

| No | Component 1 (inventive example 1 of table 1) | Component 2 (various PCEs) |
|---|---|---|
| Formulation 1 | 73 weight % | 23 weight % F-1 |
| Formulation 2 | 30 weight % | 70 weight % PCE 1 |
| Formulation 3 | 30 weight % | 70 weight % PCE 2 |
| Formulation 4 | 30 weight % | 70 weight % PCE 3 |
| 5 (100% ex. 1 of table 1) | 100 weight % | — |
| Comp. Ex. 1* | — | 100 weight % PCE 1 |
| Comp. Ex. 2* | — | 100 weight % PCE 3 |
| Comp. Ex. 3* | — | 100 weight % PCE 4 |

(*= comparative examples)

F-1 is a copolymer of ethoxylated Isoprenol and Hydroxy-ethyl-acrylate. The molecular weight is 20.000 g/mol (according to GPC).

PCE 1 is a copolymer of ethoxylated Isoprenol and acrylic acid.

PCE 2 is a copolymer of ethoxylated Isoprenol (1.100 g/mol), ethoxylated hydroxybutyl vinylether (3.000 g/mol) and acrylic acid.

PCE 3 is a copolymer of ethoxylated hydroxybutyl vinylether (3.000 g/mol) and acrylic acid. Comparative Example 3*(PCE 4) is a copolymer of Methyl-PEG Methacrylate and methacrylic acid (molar ratio 1/2). Molecular weight is 15,500 g/mol (determined from GPC).

A ultra-high performance (UHP) mortar mix was used as the cementitious test system in order to screen different formulations with regard to the rheology. The mortar consists of 900 g/l CEM I 52.5 R (Dyckerhoff white), 225 g/l micro silica (RW-Filler Q1plus) and 988 g/l quartz sand (0.1-0.3 mm). The water binder ratio (W/B) is 0.2.

As viscosity indicator the flow time to achieve 20 cm of flow on a glass plate was used. All mixes had comparable initial target flows (at the time of 5 minutes), which indicates a comparable yield.

polyether side chains (dispersant of the type f-1). From the experimental data in table 10 can be seen that the polycondensates according to this invention are not so good in the retention of the slump (no more measureable after 90 minutes), whereas the formulation 1 provides good results for the slump (cm) in the concrete test as well as the plastic viscosity. The concrete slump does not change (20 cm both at time 0 and 90 min) and the plastic viscosity only increases from 94 Pa·s to 95 Pa·s. Please compare with the data in table 10.

TABLE 10

Concrete test results for Formulation 1

| | Dosage (solid content in % by weight of cement) | $T_0$ | | $T_{90}$ | | Compressive strength [Mpa] | |
|---|---|---|---|---|---|---|---|
| | | Slump [cm] | Plastic viscosity [Pa · s] | Slump [cm] | Plastic viscosity [Pa · s] | 22 h | 7 d |
| 5 (100% ex. 1 of table 1) | 0.3 | 20 | 95 | — | — | 18 | 58 |
| Comp. Ex. 3* | 0.28 | 20 | 106 | — | — | 17 | 55 |
| Formulation 1 | 0.39 | 20 | 94 | 20 | 95 | 17 | 61 |

Comparative Example 3* (PCE 4) is a copolymer of Methyl-PEG Methacrylate and methacrylic acid (molar ratio 1/2). Molecular weight is 15,500 g/mol (determined from GPC).

TABLE 9

Results of the UHP mortar tests

| | Dosage | 5 min | | 30 min. | |
|---|---|---|---|---|---|
| Samples | [% solids by weight of binder] | End-flow in cm | Flow time to reach 20 cm | End-flow in cm | Flow time to reach 20 cm |
| Formulation 2 | 1.00% | 25.4 | 3 | 27.9 | 5 |
| Formulation 3 | 0.80% | 23.7 | 6 | 26.6 | 7 |
| Comp Ex. 1* | 1.00% | 24.5 | 4 | 22.8 | 11 |
| Comp Ex 2* | 4.00% | 24.8 | 8 | 22.8 | 28 |

(*= comparative examples)

It can be seen from the data of table 9 that in contrast to the comparative examples 3* and 4* the slump-retention of the formulations 2 and 3 is better (comparison of the slump data after 30 minutes). The difference in the flow time to reach a spread of 20 cm is still comparable after 5 minutes, but after 30 minutes the flow times become much higher for the comparative examples compared to the inventive samples. This indicates a distinct increase in the viscosity and a decrease of the workability of the comparative examples after 30 minutes, whereas the formulations according to this invention show still a very good workability, including low viscosity of the mortar.

In a further test Formulation 1 has been tested in concrete using a mix consisting of 300 kg/m³ CEM I 52.5 N (SPLC Lafarge), 100 kg/m³ blast furnace slag, 870 kg/m³ crushed sand 0/4 and 900 kg/m³ crushed aggregate 4/12. The W/B ratio was 0.46.

The rheological data were measured using the tribometer. Formulation 1 is a mixture of 73% of a polycondensate according to this invention (ex. 1 of table 1) and 27% of a non-ionic copolymer for extending workability to a cementitious mixture containing hydraulic cement and water with a relatively low weight average molecular weight and short

The invention claimed is:
1. A polycondensate containing
   (I) at least a structural unit, which is an aromatic moiety bearing a polyether side chain comprising alkylene glycol units, with the proviso that the number of ethylene glycol units in the side chain is from 9 to 41 and that the content of ethylene glycol units is higher than 80 mol % with respect to all alkylene glycol units in the polyether side chain,
   (II) at least a structural unit, which is an aromatic moiety bearing at least one phosphoric acid ester group and/or its salt, with the proviso that the molar ratio of (I) to (II) is from 0.3 to 4,
   (III) at least a methylene unit (—CH$_2$—), which is attached to two aromatic structural units Y, where
   aromatic structural units Y, independently of one another, are identical or different and are represented by structural unit (I), structural unit (II) or optionally (IV) aromatic structural units of the polycondensate, which are different from structural unit (I) and structural unit (II) and
   wherein the polycondensation degree of the polycondensate containing the units (I), (II), (III) and optionally (IV) is in the range from 10 to 75.
2. The polycondensate according to claim 1, in which the number of ethylene glycol units in the polyether side chain of structural unit (I) is from 9 to 35.
3. The polycondensate according to claim 1, in which the average molecular weight of the polycondensate is from 5,000 g/mol to 25,000 g/mol.
4. The polycondensate according to claim 1, in which the structural unit (I) is derived from an alkoxylated aromatic alcohol monomer bearing a hydroxyl group at the end of the polyether side chain.
5. The polycondensate according to claim 1, in which the structural unit (II) is derived from an aromatic alcohol monomer, which was in a first step alkoxylated and the obtained alkoxylated aromatic alcohol monomer bearing a hydroxyl group at the end of the polyether side chain was in a second step phosphorylated to the phosphoric acid ester group.

6. The polycondensate according to claim 1, in which the structural unit (I) is a phenyl poly alkylene glycol.

7. The polycondensate according to claim 1, in which the structural unit (II) is selected from the group of alkoxylated phenol phosphoric acid esters or alkoxylated hydroquinone phosphoric acid esters according to the following general structures (VI) and/or (VII), —[C$_6$H$_3$—O-(AO)$_n$—PO$_3$M$_2$]—, (VI)

-[[M$_2$O$_3$P-(AO)$_n$]—O—C$_6$H$_2$—O-[(AO)$_n$—PO$_3$M$_2$]]-, (VII)

n is in both formulae an integer from 1 to 5, A is in both formulae an alkylene with 2 to 5, M independently of one another is identical or different and is H or a cation equivalent.

8. The polycondensate according to claim 1, in which the molar ratio of ethylene glycol units from structural units (I) to phosphoric acid ester units from structural unit (II) is from 11 to 40.

9. The polycondensate according to claim 1, in which the molar ratio of the sum of structural units (I) and (II) to the structural units (IV) is higher than 1/1.

10. The polycondensate according to claim 9, in which the molar ratio of the sum of structural units (I) and (II) to structural unit (IV) is lower than 10/1 and the structural unit (IV) is an aromatic moiety bearing a polyether side chain comprising alkylene glycol units, with the proviso that the number of ethylene glycol units in the side chain of structural unit (IV) is from 42 to 120 and that the content of ethylene glycol units is higher than 80 mol % with respect to all alkylene glycol units in the polyether side chain of structural unit (IV).

11. The polycondensate according to claim 1, in which the molar ratio of the sum of structural units (I) and (II) to the structural units (III) is from 0.8/1 to 1/0.8.

12. The polycondensate according to claim 1 in a formulation together with further dispersants selected from the group of a) sulfonated melamine-formaldehyde condensates, b) lignosulfonates, c) sulfonated ketone-formaldehyde condensates, d) sulfonated naphthalene-formaldehyde condensates (BNS), e) polycarboxylate ethers (PCE), f) non-ionic copolymers for extending workability to a cementitious mixture containing hydraulic cement and water, wherein the copolymer comprises residues of at least the following monomers:

Component A comprising an ethylenically unsaturated carboxylic acid ester monomer comprising a moiety hydrolysable in the cementitious mixture, wherein the hydrolysed monomer residue comprises an active binding site for a component of the cementitious mixture; and Component B comprising an ethylenically unsaturated, carboxylic acid ester or alkenyl ether monomer comprising at least one C$_{2-4}$ oxyalkylene side group of 1 to 350 units or g) phosphonate containing dispersants according to the following formula R—(OA)$_n$-N—[CH$_2$—PO(OM$_2$)$_2$]$_2$ whereby R is H or a saturated or unsaturated hydrocarbon radical, optionally a C1 to C15 alkyl radical, A is the same or different and independently from each other an alkylene with two to 18 carbon atoms, optionally ethylene and/or propylene, n is an integer from 5 to 500, and M is H, an alkali metal, ½ earth alkali metal and/or an amine and whereby any combination of the further dispersants a) to g) is possible.

13. The polycondensate according to claim 12, in which the further dispersant in the formulation is f-1) a non-ionic copolymer with a weight average molecular weight M$_{W\,from}$ 5,000 g/mol to less than 25,000 g/mol for extending workability to a cementitious mixture containing hydraulic cement and water, wherein the copolymer comprises residues of at least the following monomers:

Component A comprising an ethylenically unsaturated carboxylic acid ester monomer comprising a moiety hydrolysable in the cementitious mixture, wherein the hydrolysed monomer residue comprises an active binding site for a component of the cementitious mixture; and Component B comprising an ethylenically unsaturated, carboxylic acid ester or alkenyl ether monomer comprising at least one C$_{2-4}$ oxyalkylene side group of 10 to 70 units.

14. A building material mixture comprising one or more polycondensates according to claim 1 and one or more inorganic binders selected from the group of α-calcium sulfate hemihydrate, β-calcium sulfate hemihydrate, calcium sulfate in the form of anhydrite, slag sand, fly ash, fumed silica, blast furnace slag, natural pozzolanes, burnt oil shale and/or, Portland cement.

15. The building material mixture according to claim 14 comprising aggregates and Portland cement and optionally further binders selected from the group of slag sand, fly ash, fumed silica, blast furnace slag, natural pozzolanes and burnt oil shale, and any combination thereof.

16. A method comprising dosing inorganic binder with the polycondensates according to claim 1 for the dispersion of the inorganic binders, selected from the group of α-calcium sulfate hemihydrate, β-calcium sulfate hemihydrate, calcium sulfate in the form of anhydrite, slag sand, fly ash, fumed silica, blast furnace slag, natural pozzolanes, burnt oil shale and/or Portland cement, optionally wherein the Portland cement is present with a proportion greater than 40% by weight based on the total amount of the inorganic binder.

17. A method comprising dosing concrete with the polycondensates according to claim 1 for the reduction of the plastic viscosity of the concrete.

18. A method comprising dosing polycondensates according to claim 1 in self-compacting concrete with a contents of fines between 300 kg/m$^3$ to 700 kg/m$^3$, the definition of fines is all particles, which pass a sieve with an opening of 0.125 mm according to EN 933-1, the self-compacting concrete comprising, water, aggregates and Portland cement and optionally further binders selected from the group of slag sand, fly ash, fumed silica, blast furnace slag, natural pozzolanes and burnt oil shale, and any combination thereof.

19. The building material mixture according to claim 14, wherein Portland cement is present with a proportion greater than 40% by weight based on the total amount of the inorganic binder.

* * * * *